(12) United States Patent
Samo

(10) Patent No.: US 10,459,678 B2
(45) Date of Patent: Oct. 29, 2019

(54) SYSTEM FOR TRACKING AND GRAPHICALLY DISPLAYING LOGISTICAL, BALLISTIC, AND REAL TIME DATA OF PROJECTILE WEAPONRY AND PERTINENT ASSETS

(71) Applicant: George Joseph Samo, Sewickley, PA (US)

(72) Inventor: George Joseph Samo, Sewickley, PA (US)

( * ) Notice: Subject to any disclaimer, the term of this patent is extended or adjusted under 35 U.S.C. 154(b) by 0 days.

(21) Appl. No.: 15/856,638

(22) Filed: Dec. 28, 2017

(65) Prior Publication Data

US 2018/0196628 A1 Jul. 12, 2018

Related U.S. Application Data

(60) Provisional application No. 62/443,175, filed on Jan. 6, 2017.

(51) Int. Cl.
| | |
|---|---|
| *G09F 3/14* | (2006.01) |
| *G06F 3/14* | (2006.01) |
| *F41A 9/62* | (2006.01) |
| *F41G 1/14* | (2006.01) |
| *F41G 11/00* | (2006.01) |
| *F41G 1/01* | (2006.01) |
| *F41G 3/08* | (2006.01) |
| *F41G 3/14* | (2006.01) |
| *F41G 3/16* | (2006.01) |
| *F41G 3/06* | (2006.01) |

(Continued)

(52) U.S. Cl.
CPC .............. *G06F 3/1423* (2013.01); *F41A 9/62* (2013.01); *F41G 1/01* (2013.01); *F41G 1/14* (2013.01); *F41G 3/08* (2013.01); *F41G 3/145* (2013.01); *F41G 3/165* (2013.01); *F41G 11/003* (2013.01); *F41G 1/48* (2013.01); *F41G 3/06* (2013.01); *G09G 3/32* (2013.01)

(58) Field of Classification Search
CPC ... F41G 1/00; F41G 1/30; F41G 3/005; F41G 3/06; F41G 1/38; F41G 3/08
USPC .......................................................... 42/111
See application file for complete search history.

(56) References Cited

U.S. PATENT DOCUMENTS

| | | | |
|---|---|---|---|
| 5,142,805 A | 9/1992 | Horne et al. | |
| 5,307,053 A * | 4/1994 | Wills | ...................... F41A 17/06 340/539.1 |
| 5,406,730 A | 4/1995 | Sayre | |

(Continued)

*Primary Examiner* — Joshua E Freeman
(74) *Attorney, Agent, or Firm* — Buchanan Ingersoll & Rooney PC

(57) ABSTRACT

The system includes various components to track and graphically display data related to a user, a weapon, munitions for the weapon, other munitions and equipment used by the user, and similar information about other users. The system can include a display device that can be attached to the weapon. A user can look through the display device while looking down the line-of-sight of the weapon to obtain the data on a heads-up-display. The information displayed can include the point-of-impact of a projectile to be fired from the weapon, the number of unused rounds in the user's inventory, whether a magazine is inserted into the weapon, a map of the field of view, identification of friendlies and hostiles, a distance to a target, a count of other assets (e.g., munitions and other equipment) in the user's inventory, and other information about other users.

19 Claims, 27 Drawing Sheets

(51) Int. Cl.
*F41G 1/48* (2006.01)
*G09G 3/32* (2016.01)

(56) References Cited

U.S. PATENT DOCUMENTS

| | | |
|---|---|---|
| 5,642,581 A | 7/1997 | Herold et al. |
| 6,779,518 B2 | 8/2004 | Dobbins |
| 6,860,259 B2 | 3/2005 | Rice et al. |
| 7,234,260 B2 | 6/2007 | Acarreta |
| 7,661,217 B2 | 2/2010 | Pikielny |
| 8,046,946 B2 | 11/2011 | Packer et al. |
| 8,117,778 B2 | 2/2012 | Clark et al. |
| 8,215,044 B2 | 7/2012 | Arbouw |
| 8,459,552 B2 | 6/2013 | Arbouw |
| 8,474,172 B2 * | 7/2013 | Ivtsenkov ............. F41A 17/063 340/505 |
| 8,485,085 B2 | 7/2013 | Goree et al. |
| 8,578,920 B2 | 11/2013 | Estrate |
| 8,651,381 B2 | 2/2014 | Rudich |
| 8,733,006 B2 | 5/2014 | Williams et al. |
| 8,850,730 B2 | 10/2014 | Clark et al. |
| 8,959,824 B2 | 2/2015 | Sammut et al. |
| 8,978,539 B2 | 3/2015 | Teetzel et al. |
| 9,114,312 B2 | 8/2015 | Liao |
| 9,217,616 B2 | 12/2015 | Sullivan et al. |
| 9,273,918 B2 | 3/2016 | Amit et al. |
| 9,310,163 B2 | 4/2016 | Bay |
| 2002/0129535 A1 * | 9/2002 | Osborn, II ............... F41G 1/38 42/122 |
| 2003/0195046 A1 * | 10/2003 | Bartsch ................ F41A 33/02 463/49 |
| 2006/0162226 A1 * | 7/2006 | Tai ........................ F41G 1/30 42/132 |
| 2008/0163749 A1 * | 7/2008 | Reimer .................... F41G 1/38 89/41.05 |
| 2011/0111374 A1 * | 5/2011 | Charles .................. F41A 33/02 434/19 |
| 2012/0042559 A1 * | 2/2012 | Bockmon ............... F41A 27/30 42/111 |
| 2012/0159833 A1 * | 6/2012 | Hakanson ................ F41G 1/30 42/131 |
| 2013/0152447 A1 * | 6/2013 | Ostergren ................ F41G 1/30 42/123 |
| 2013/0263491 A1 * | 10/2013 | Jung ......................... F41G 1/30 42/113 |
| 2014/0184788 A1 * | 7/2014 | McHale .................... F41G 1/38 348/135 |
| 2015/0059225 A1 * | 3/2015 | Huang ..................... F41G 1/30 42/113 |
| 2015/0369554 A1 | 12/2015 | Kramer |
| 2016/0033221 A1 | 2/2016 | Schmehl et al. |
| 2016/0069629 A1 | 3/2016 | Seckman |
| 2016/0069640 A1 | 3/2016 | Pretorius |
| 2016/0195351 A1 | 7/2016 | Burden |
| 2016/0327365 A1 * | 11/2016 | Collin ...................... F41G 1/30 |

\* cited by examiner

SYSTEM FOR TRACKING AND GRAPHICALLY DISPLAYING LOGISTICAL, BALLISTIC, AND REAL TIME DATA OF PROJECTILE WEAPONRY AND PERTINENT ASSETS

CROSS-REFEENCE TO RELATED APPLICTIONS

This patent application is related to and claims the benefit of priority to U.S. Provisional Application No. 62/443,175, filed on Jan. 6, 2017, the entire contents of which is incorporated herein by reference.

FIELD OF THE INVENTION

The present disclosure is directed toward a system for tracking and graphically displaying data related to a projectile of a weapon, the weapon itself, and other pertinent assets.

BACKGROUND OF THE INVENTION

Conventional systems for tracking and displaying data related to a projectile and other assets associated with a firearm can be appreciated from U.S. Pat. Nos. 5,142,805, 5,406,730, 5,642,581, 6,779,518, 6,860,259, 7,234,260, 7,661,217, 8,046,946, 8,117,778, 8,215,044, 8,459,552, 8,485,085, 8,578,920, 8,651,381, 8,733,006, 8,850,730, 8,959,824, 8,978,539, 9,114,312, 9,273,918, 9,217,616, 9,310,163, US 20100007580, US 20100126485, US 20100196859, US 20110072703, US 20110162245, US 20110178729, US 20120033195, US 20120117848, US 20140158763, US 20140184476, US 20140378088, US 20150054964, US 20150369554, US 20160033221, US 20160069629, US 20160069640, and US 20160195351. Conventional systems may be inaccurate and inefficient. Additionally, conventional systems may be limited in functionality and versatility. These and other disadvantages may limit the use and applicability of tracking and display devices for use with firearms and other weaponry.

BRIEF SUMMARY OF THE INVENTION

Embodiments of the system can include various components to track and graphically display data related to a user, a weapon (e.g., rifle), munitions for the weapon, other munitions and equipment used by the user, similar information about other users, etc. It is contemplated for the system to be used by users who are soldiers, recreational shooters, police, or other tactical units to combat enemy or hostile forces. Some embodiments of the system can track and graphically display data related to enemy forces and other targets.

The system can include a display device that can be attached to the rifle of a user. A user can look through the display device while looking down the line-of-sight of the rifle to obtain the data on a heads-up-display. For example, the display device can graphically and/or textually illustrate various types of information for the user, such as the point-of-impact of a projectile to be fired from the rifle, the number of unused rounds in the user's inventory, whether the magazine is inserted into the rifle, a map of the field of view, identification of friendlies and hostiles, a distance to a target, a count of other assets (e.g., munitions and other equipment) in the user's inventory, and other information about other users.

Other components of the system can include at least one sensor, a round counter, a magazine insert sensor, a range finder, an electronic controller or a fob, and RFID tags. Any one or combination of these components can be in electrical communication with each other. The various components can be used to acquisition the real-time data, allowing the system to generate real-time updates for display by the display device. The system can determine real-time environmental characteristics to accurately, and without interruption, compute and display a precise ballistics trajectory for the projectile, including a point-of-impact of the projectile. Some of the real-time data and real-time updates can include continuous computation of the user's position, the firearm's position, the ballistic characteristics of the projectile, the computed point-of-impact of the projectile, the distance to a target, the coordinate point of a user, the coordinate point of a target, differential of inclination, relative orientation, etc. The system can also take into account and correct for environmental and user changes such as windage, temperature, barometric pressure, caliber of round, barrel length, rifle twist, grains of propellant, coefficient of friction, humidity, tilt of the firearm, projectile weight, projectile velocity, difference of elevation, etc.

Some embodiments can include multiple display devices in communication with each other to form a network. For example, each display device can be assigned to, or otherwise associated with, a user, allowing each user to share information about each user. With a network of devices in communication, the system can be used to track users (as well as user devices and user assets) and the permit synchronous communication between users. Each user can quickly view and assess his or her condition, as well as the condition of others, with accurate, real-time data displayed via the display device without requiring the user to look away from the field of view.

In at least one embodiment, a display system can include a display device. The display case can include a case configured to be attached to a weapon. The weapon can be capable of firing a projectile. The display device can include a graphics display supported by and/or housed within the case. The graphics display can include at least one sensor configured to obtain sensor data. The graphics display can include a display processor configured to receive the sensor data and process the sensor data to generate information. The information can include at least a point-of-impact of the projectile. The graphics display can include a display screen configured to display a head-up-display comprising the information.

In some embodiments, the at least one sensor comprises a plurality of sensors. Some embodiments can include a plurality of display devices. In some embodiments, the graphics display of each display device can include a display transceiver.

In some embodiments, the plurality of display devices can include a first display device and a second display device. The first display device can include a first graphics display configured to generate first information, and a first display transceiver configured to transmit the first information. The second display device can include a second graphics display configured to generate second information, and a second display transceiver configured to transmit the second information. The first display transceiver is configured to receive the second information and the second display transceiver is configured to receive the first information. The first display device can be configured to display the first information and at least a portion of the second information via the first graphics display. The second display device can be configured to display the second information and at least a portion of the first information via the second graphics display.

Some embodiments can include a range finder including a range finder transceiver, the range finder configured to generate ranging data. The graphics display can include a display transceiver. The display transceiver can be configured to receive the ranging data and transmit the ranging data to the display processor, the display processor using the ranging data to generate the information.

Some embodiments can include a round recorder including a round recorder transceiver, the round recorder configured to generate a round count signal. The graphics display can include a display transceiver. The display transceiver can be configured to receive the round count signal and transmit the round count signal to the display processor, the display processor using the round count signal to generate the information.

Some embodiments can include a magazine insert sensor including a magazine insert sensor transceiver, the magazine insert sensor configured to generate a magazine insert signal. The graphics display can include a display transceiver. The display transceiver can be configured to receive the magazine insert signal and transmit the magazine insert signal to the display processor, the display processor using the magazine insert signal to generate the information.

Some embodiments can include an electronic controller including an electronic controller transceiver, the electronic controller configured to generate electronic controller data. The graphics display can include a display transceiver. The display transceiver can be configured to receive the electronic controller data and transmit the electronic controller data to the display processor, the display processor using the electronic controller data to generate the information.

In some embodiments, the electronic controller can include an RFID scanner capable of scanning for RFID tags. At least one RFID tag can be associated with an asset. Upon the RFID scanner detecting the at least one RFID the associated with the asset, an inventory log can be generated for the asset as part of the electronic controller data.

Some embodiments can include a third-party device including a third-party transceiver, the third-party device configured to generate a third-party data. The graphics display can include a display transceiver. The display transceiver can be configured to receive the third-party data and transmit the third-party data to the display processor, the display processor using the third-party data to generate the information.

In some embodiments, the graphics display can include at least one viewing pane arranged adjacent the display screen. In some embodiments, the at least one viewing pane can include a first viewing pane adjacent the display screen and a second viewing pane adjacent to the display screen.

In some embodiments, the weapon can include a front sight and a rear sight defining a line-of-sight. The case can include a case first end and a case second end defining a longitudinal axis. The longitudinal axis can be co-axial with the line-of-sight when the case is attached to the weapon.

In some embodiments, the graphics display can include a light emitting diode assembly configured to generate at least one pixel on the display screen. This can include a light emitting diode assembly having a plurality of light emitting diodes (LEDs). Any of the LEDs can be an organic LED, or other type of LED known in the art.

Some embodiments can include a mount configured to attach to a portion of the weapon and configured to temporarily attach the case thereto. In some embodiments, the mount can be a pitcatinny mount or a weaver mount.

In at least one embodiment, a display system can include a plurality of display devices. Each display device can include a case configured to be attached to a weapon. The weapon can be capable of firing a projectile. Each display device can include a graphics display supported by and/or housed within the case. Each graphics display can include plurality of sensors configured to obtain sensor data. Each graphics display can include a display processor configured to receive the sensor data and process the sensor data to generate information, the information comprising at least a point-of-impact of the projectile. Each graphics display can include a display screen configured to display a head-up-display comprising the information. Each display device can include a display transceiver configured to receive and transmit the information. The system can further include a range finder including a range finder transceiver, the range finder configured to generate and transmit ranging data, the display transceiver configured to receive the ranging data. The system can further include a round recorder including a round recorder transceiver, the round recorder configured to generate and transmit a round count signal, the display transceiver configured to receive the round count signal. The system can further include a magazine insert sensor including a magazine insert sensor transceiver, the magazine insert sensor configured to generate and transmit a magazine insert signal, the display transceiver configured to receive the magazine insert signal. The system can further include an electronic controller including an electronic controller transceiver, the electronic controller configured to generate and transmit electronic controller data, the display transceiver configured to receive the electronic controller data. The electronic controller can further include wireless communication circuitry configured to establish a network of the plurality of display devices.

In at least one embodiment, a method for establishing a display system can involve providing a plurality of display devices. Each display device can include a case configured to be attached to a weapon. The weapon can be capable of firing a projectile. Each display device can include a graphics display supported by and/or housed within the case. Each graphics display can include a plurality of sensors configured to obtain sensor data. Each graphics display can include a display processor configured to receive the sensor data and process the sensor data to generate information, the information comprising at least a point-of-impact of the projectile. Each graphics display can include a display screen configured to display a head-up-display comprising the information. Each display device can include a display transceiver configured to receive and transmit the information. The method can further involve providing a plurality of electronic controllers. Each electronic controller can include an electronic controller transceiver. Each electronic controller can be configured to generate and transmit electronic controller data. The display transceiver can be configured to receive the electronic controller data. The electronic controller can further include wireless communication circuitry. The method can further involve generating a network of the plurality of display devices, allowing each display device to communicate with each other display device. The method can further involve generating a hierarchy of operational control based on the electronic controller data. At least one display device can display information that is different from at least one other display device based on the hierarchy of operational control.

In some embodiments, the method for establishing a display system can involve painting a target, wherein the sensor data can include GPS data, the information can include at least one friendly identified via the GPS data, and painting the target involves highlighting a target not identified as a friendly. The method can further involve displaying the at least one friendly and the painted target on the display screen.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The above and other objects, aspects, features, advantages and possible applications of the present invention will be more apparent from the following more particular description thereof, presented in conjunction with the following drawings, in which.

DETAILED DESCRIPTION OF THE INVENTION

Figure 1:
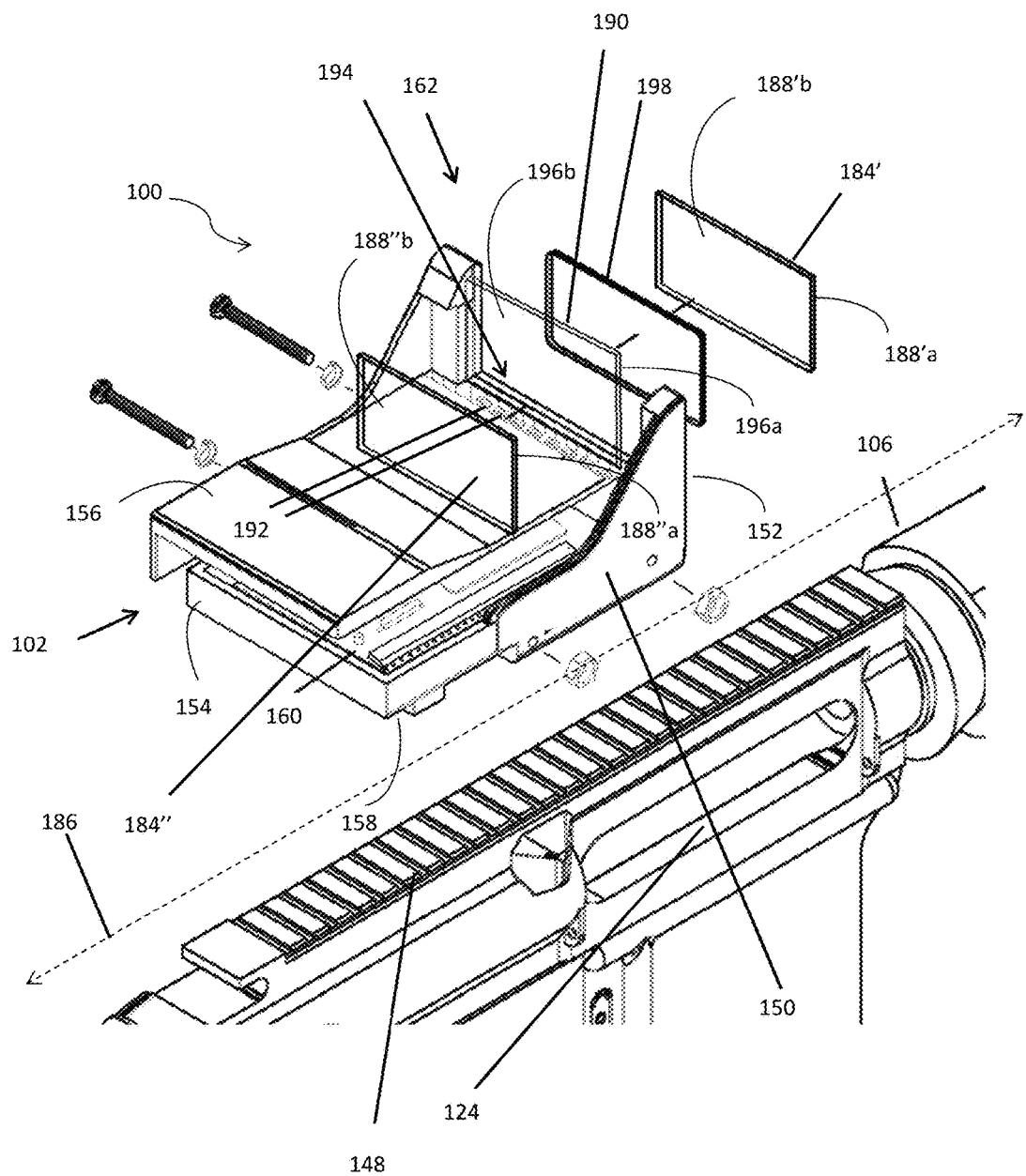
FIG. 1 shows an embodiment of the display device that can be used with the system.
Figure 2:
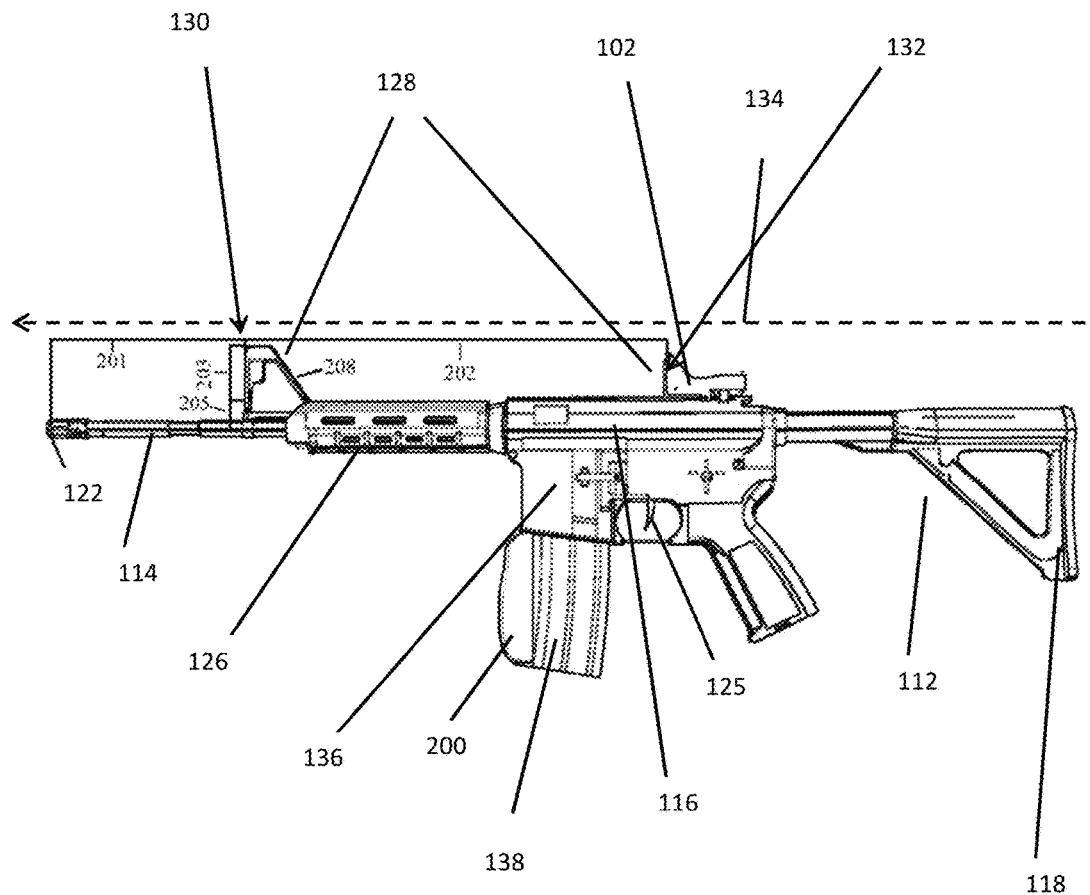
FIGS. 2-5 show the display device in calibration mode to set parameters for use by the system.
Figure 3:
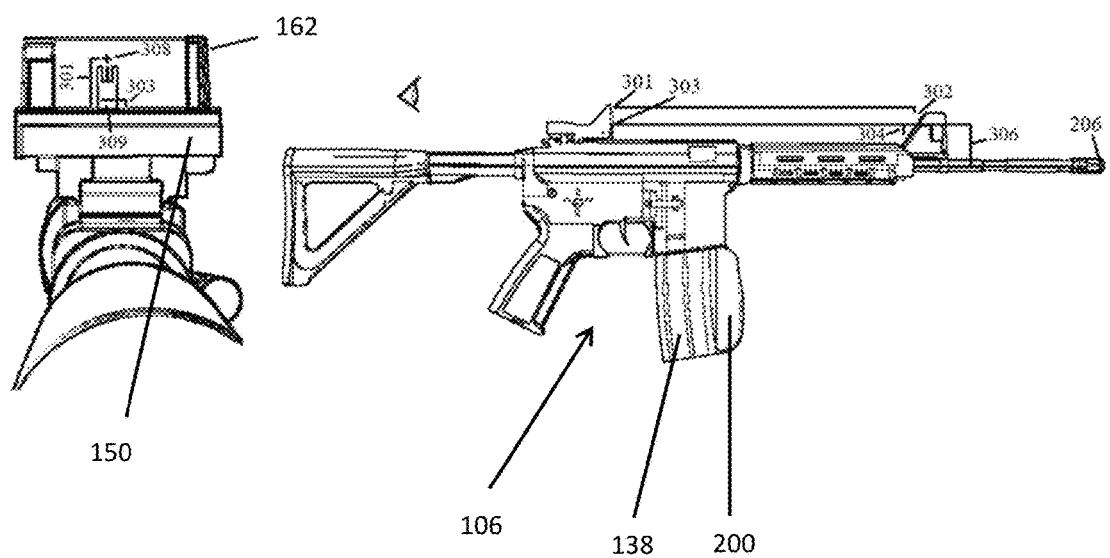
Figure 4:
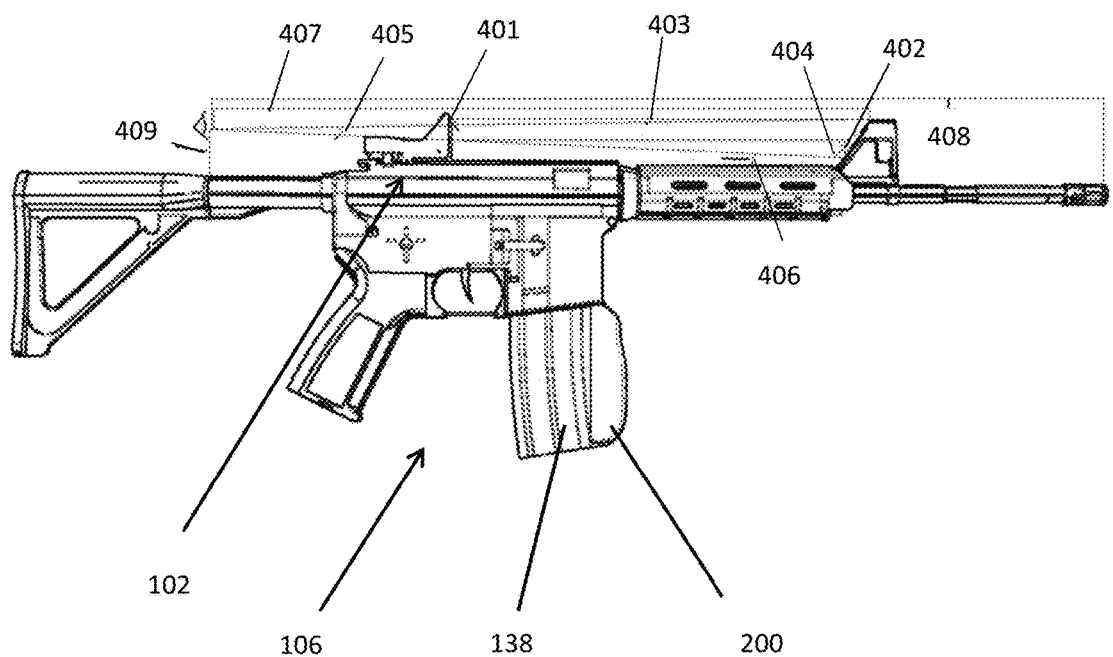
Figure 5:
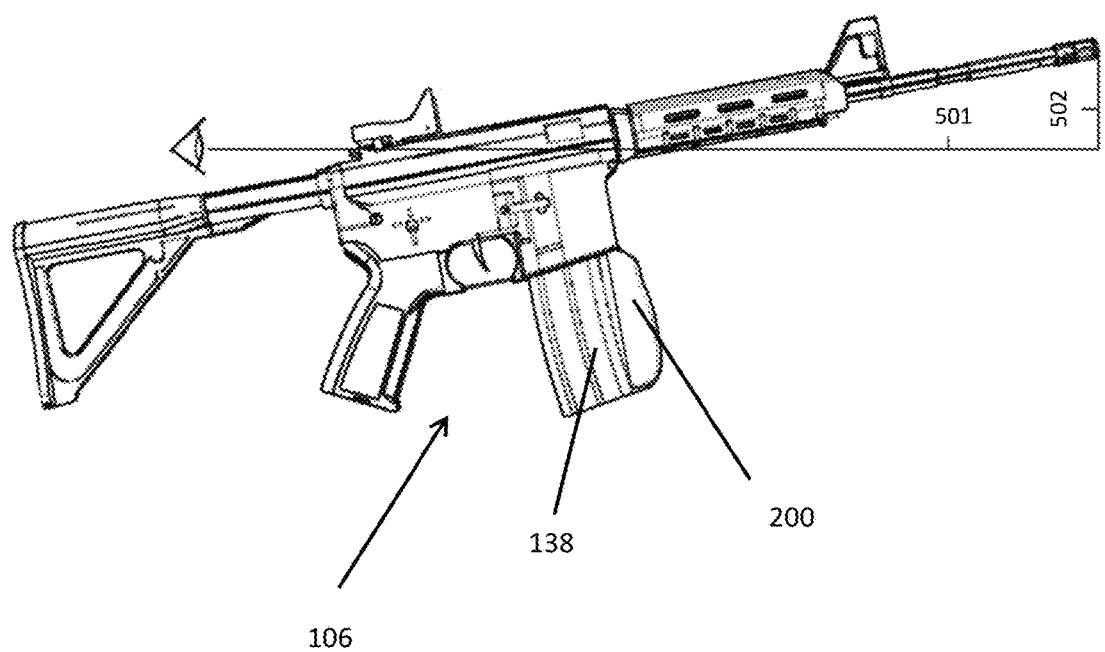

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Referring to FIGS. 1-12, embodiments of the system 100 can be configured to graphically and/or textually display information about a user 101 via a display device 102. The information can include information about a user 101, a user's weapon 106, user assets 104, and similar information about other users 101. The information can also include a user's 101 position, the rifle's 106 position, ballistic characteristics of the projectile 108, the computed point-of-impact of the projectile 108, etc. The information about the user 101 can include the user's 101 health, blood type, name, etc. Other information can relate to other assets 104 (e.g., munitions, rounds, grenades, grenade rounds, mortar rounds, tank rounds, explosives, medical equipment, etc.) in the user's 101 inventory. A user's 101 inventory can be items on a user's 101 person, items at the user's 101 immediate disposal, items under the user's 101 control, etc. Other information can include maintenance information about a user's 101 assets 104 (e.g., the time in service without being maintenance for a weapon 106, the expiration date of certain medical equipment, etc.). The information can also include information about other users 101, such as other members of a team (e.g., a fighting unit). For example, the system 100 can include a plurality of display devices 102, each display device 102 being associated with a different user 101 and in communication with each other to generate a network 110 (see FIG. 25). The information can be transmitted between the display devices 102 and displayed for each user 101 to see. In some embodiments, the information can be discriminatory shared and displayed between the display devices 102 of the network 110.

As shown in FIGS. 1-5, the system 100 can include a display device 102. The display device 102 can be attachable to a portion of a weapon 106 or may be used as a standalone device 102. The weapon 106 can be a firearm (e.g., a rifle, pistol, etc.) used to fire a projectile 108 (e.g., a bullet, a grenade round, etc.). The exemplary embodiments disclosed herein describe and illustrate the weapon as being a rifle 106; however, as noted above the weapon can be other types of firearms. The rifle 106 can include a butt end 118 and a muzzle end 122. The butt end 118 can include a stock 112, leading to a barrel 114 that terminates at the muzzle end 122. The rifle 106 can include a receiver portion 116 positioned between the butt end 118 and the muzzle end 122. The receiver portion 116 can include a breach 124 and a trigger assembly 125. The rifle 106 can further include a handguard 126 attached to a portion of the barrel 114.

The rifle 106 can include a sight assembly 128. The sight assembly 128 can include a rear sight 130 positioned at or near the muzzle end 122. For example, the rear sight 130 can be a post, bead, or other element extending from a surface of the barrel 114 at or near the muzzle end 122. The sight assembly 128 can include a front sight 132 positioned at or near the receiver portion 116. For example, the front sight 132 can be a member with a notch, aperture, etc. extending from a surface of the barrel 114 at or near the receiver portion 116. A line extending from the front sight 132 to the rear sight 130 can define a line-of-sight 134.

It should be noted that the designations of the front sight 132 being the "front" and rear sight 130 being the "rear" are arbitrary and for illustration only. For instance, the front sight 132 can be the sight positioned at or near the muzzle end 122. Similarly, the rear sight 130 can be the sight positioned at or near the receiver portion 116. The formulas for computing the point-of-impact and other parameters disclosed herein are set with the front sight 132 being the sight positioned at or near the receiver portion 116 and the rear sight 130 can be the sight positioned at or near the muzzle end 122; however, if another designation of the front and rear sights is used, then the formulas can be changed accordingly without deviating from the teachings of the invention.

In some embodiments, the receiver portion can include a magazine well 136. The magazine well 136 can be configured to receive a magazine 138. The magazine 138 can be a device used to hold at least one cartridge including a projectile 108. A cartridge including a projectile 108 can be referred to as a round. It is contemplated for the magazine 138 to be a generally rectangular shaped hollow member with a spring-loaded foot plate 140 configured to receive a plurality rounds; however, other types and shapes of magazines 138 can be used. The magazine 138 can include a base end 142 and a feed end 144 (see FIGS. 13-14). The feed end 144 can be configured to provide ingress and egress to the hollow portion of the magazine 138. The spring-loaded foot plate 140 can be configured to traverse the magazine 138 back and forth from the base end 142 to the feed end 144 via a foot plate guiding well 146.

When the magazine 138 is empty, the spring-loaded foot plate 140 can move towards the feed end 144. As a round is inserted into the magazine 138 via the feed end 144, the spring-loaded foot plate 140 can move towards the base end 142 of the magazine 138. The spring-loaded foot plate 140 can move incrementally towards the base end 142 as each round is inserted. As a round is removed from the magazine 138, the spring-loaded foot plate 140 can move incrementally towards the feed end 144. This arrangement can be used to advance the rounds to a feed end 144 of the magazine 138 as each round is caused to be removed from the magazine 138 via the feed end 144.

The magazine well 136 of the rifle 106 can be configured to allow slidable insertion and removal of the magazine 138. The feed end 144 can be configured to spearhead the insertion of the magazine 138 into the magazine well 136 of the rifle 106. Once inserted, the magazine 138 may be temporarily locked in place. In a properly inserted position, the magazine 138 can position the round that is nearest the feed end 144 within the breach 124 of the rifle. The rifle 106 can include other mechanical features (e.g., a bolt, extractor grooves, buffer spring, forward assist, firing pin, trigger, etc.) to allow the rifle 106 to automatically feed a round from the magazine 138 to the breach 124, allow for semi-automatic or automatic firing of the round, and allow for extraction of the spent cartridge case from the breach 124 for feeding of another round into the breach 124 from the magazine 138. The mechanical operation and mechanical components of the magazine 138 and the rifle 106 to accomplish these tasks are known to those skilled in the art. The importance of the mechanics of the magazine 138 and how it cooperates with the mechanics of the rifle relates to the round recorder 200 and magazine insert sensor 217.

The display device 102 can include a mount 148. The mount 148 can be configured as a support or similar structural element for facilitating temporary or permanent attachment to a portion of the rifle 106. The mount 148 can also be configured for facilitating temporary or permanent attachment of the display device 102 to a portion of the mount 148. For instance, the mount 148 can be attached to a portion of the barrel 114 and/or a portion of the receiver portion 116. The display device 102 can be attached to a portion of the mount 148 such that the display device 102 is positioned at or near the front sight 132, which can include being over the front sight 132. Examples of mounts 148 that can be used may include a pitcatinny mount, weaver mount, etc.

The display device 102 can include a case 150. The case 150 can be configured to support or house at least one component of the display device 102. The case 150 can have a case first end 152, a case second end 154, a case top 156, and a case bottom 158. The case bottom 158 can be configured to attach to a portion of the mount 148. For example, the case bottom 158 can be configured to engage the mount 148 via a track and guide assembly, a bracket with screws or bolts or locking nuts, etc. A line between the case first end 152 and the case second end 154 can define a case longitudinal axis 186. The case 150 can have an open case top 156 so as to form a platform. For example, the case 150 can be configured as a platform to support a graphics display 162 extending upward from the case top 156. The platform portion of the case 150 can be configured to house display circuitry 160 and facilitate electrical connection between the display circuitry 160 and the graphics display 162 of the display device 102. The case 150 can be made from a rigid material such as metal, plastic, polyurethane, etc. In some embodiments, the case 150 can be insulated to protect the components supported by it or housed within it. This can include insulation from shock, extreme temperatures, water, etc. For example, the case 150 can include polypropylene foam to insulate from shock or temperature, rubber or silicon sealants to insulate form water, etc. Other materials for insulating the case 150 can be used.

Figure 6:
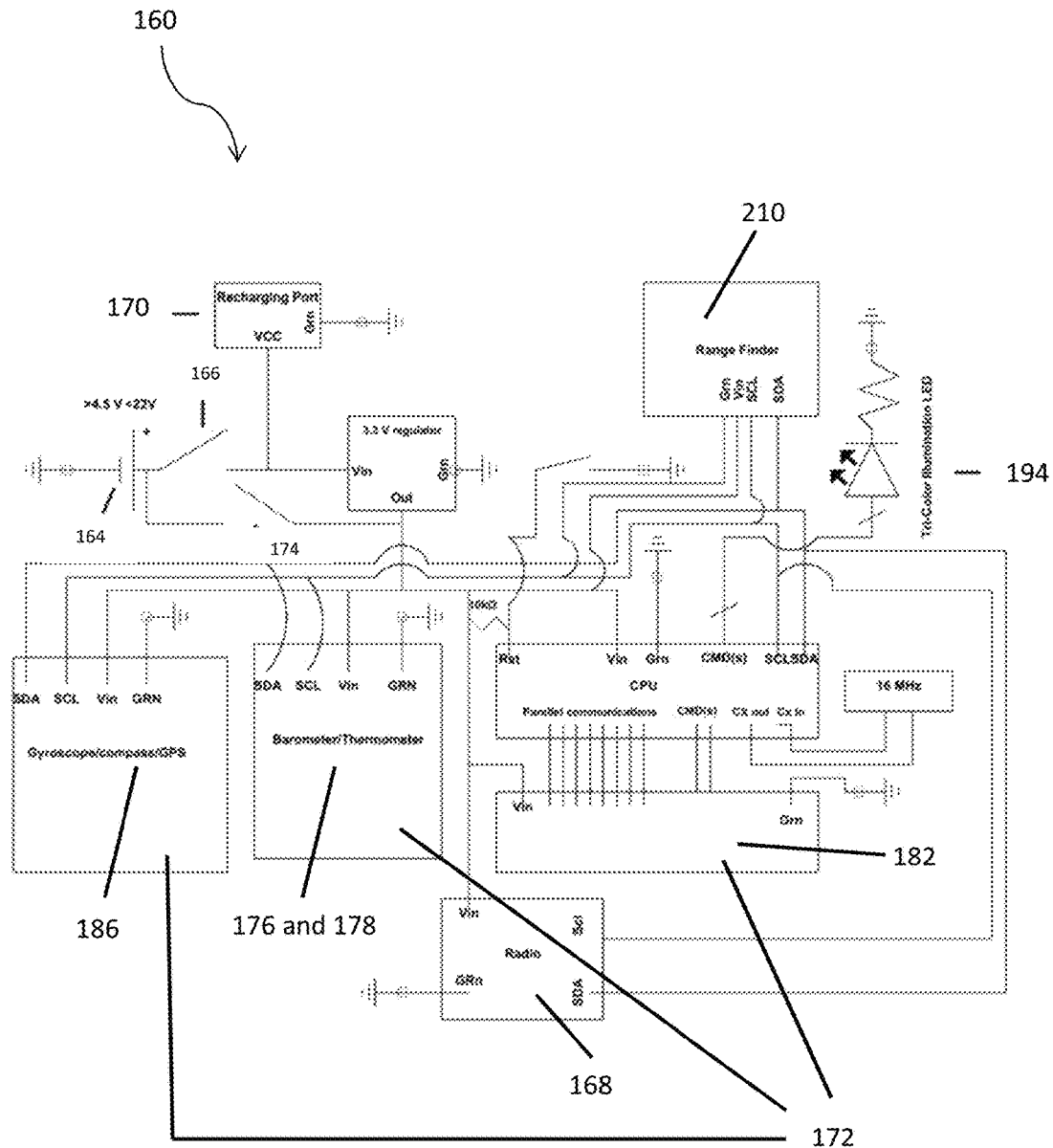
FIG. 6 shows an embodiment of display circuitry that can be used with the display device.
Figure 7:
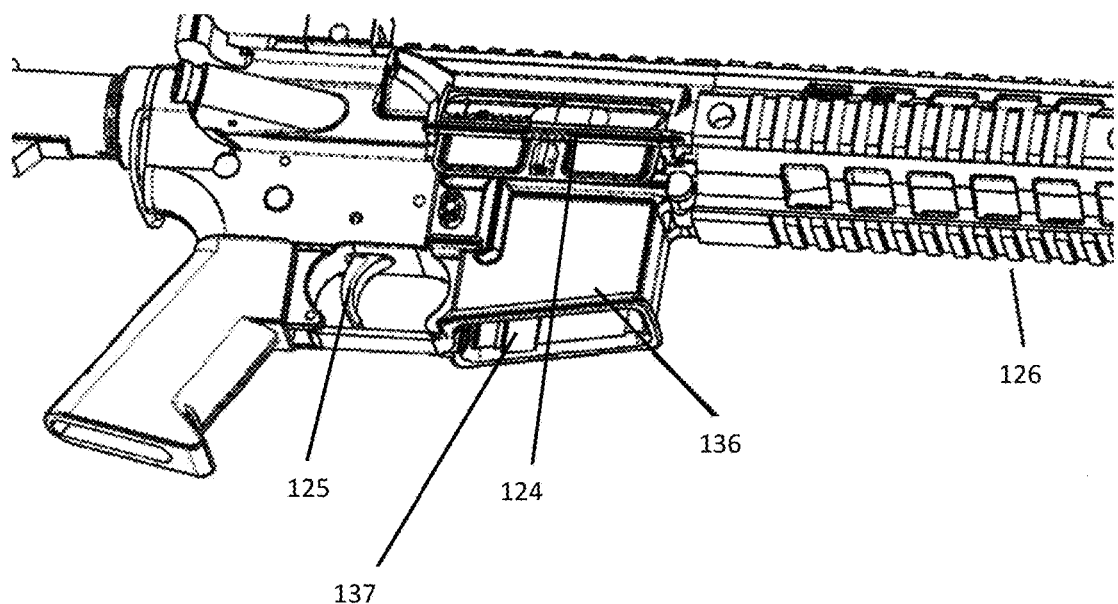
FIG. 7 shows a partial view of a rifle that can be used with an embodiment of the system.
Figure 8:
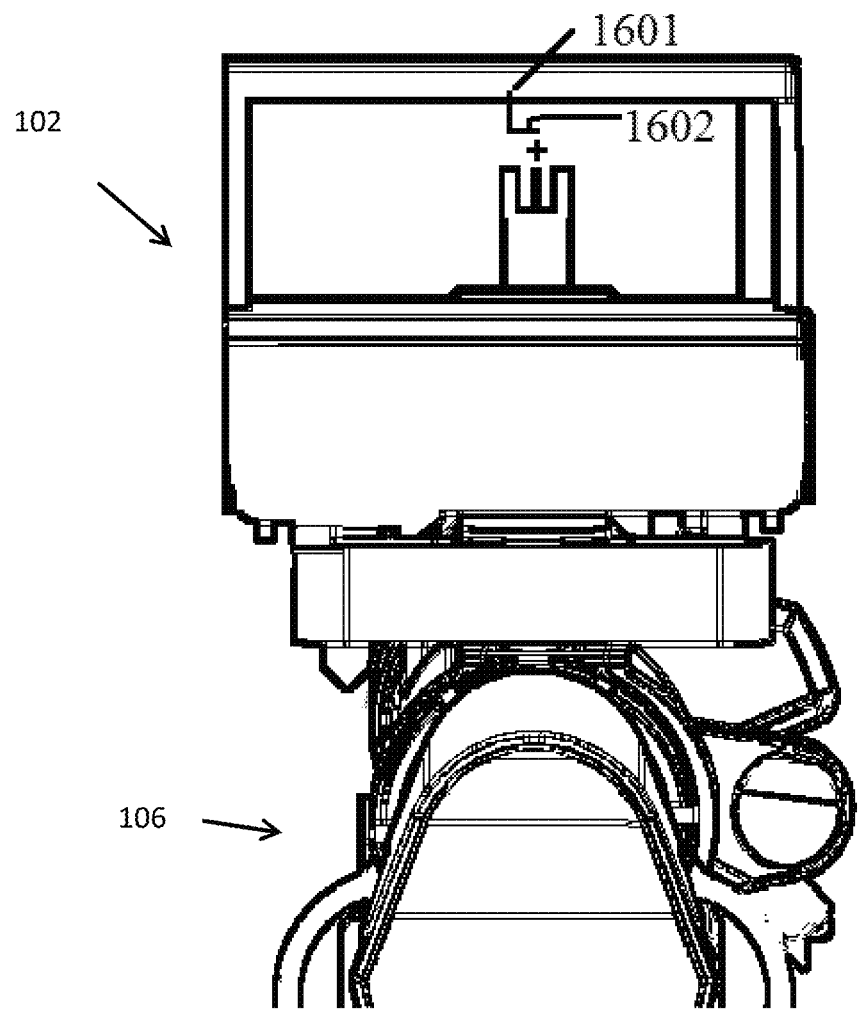
FIGS. 8-12 show various display modes and various types of information displayed via an embodiment of the display device.
Figure 9:
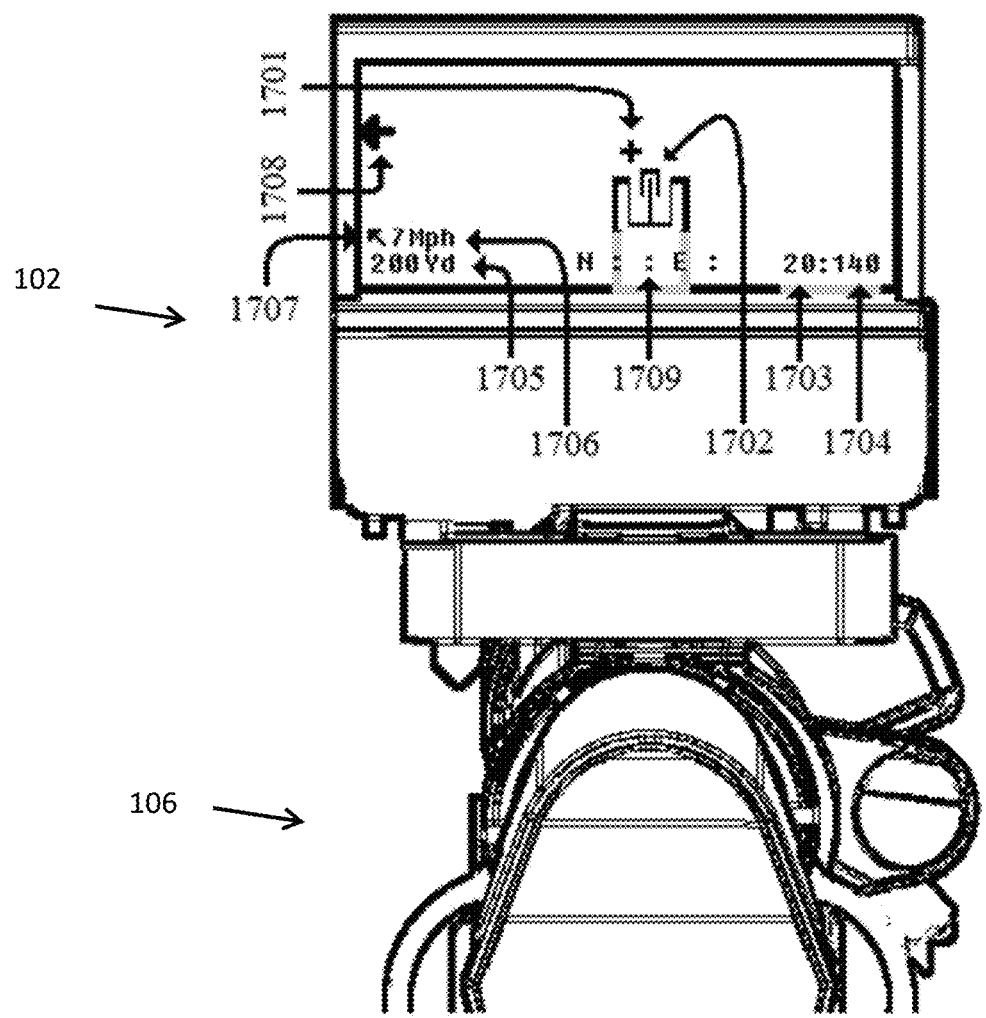

As seen in FIG. 6, the display circuitry 160 can include a display processor with an associated non-volatile, non-transitory memory. In some embodiments, the display circuitry 160 can be attached to or embedded on a circuit board. The circuit board can be housed within a portion of the case 150. The circuit board may include any one or combination of a display battery 164, a display power switch 166, a display transceiver 168, a display recharging port 170, and various other integrated circuitry (e.g., electronic clock 172), resistors, capacitors, etc. The circuit board can include, or be in electrical connection with, at least one sensor 172. The sensor 172 can include any one or combination of a barometer 176, a thermometer 178, a gyroscope 180, a GPS device 182, etc. These components can be placed into electrical connection with each other. For example, the display processer can be powered by the display battery 164, wherein a voltage regulator can regulate the power to the display circuitry 160. The display device 102 can be turned on and off via the display power switch 166. For example, activating the display power switch 166 can cause the voltage regulator to modify the voltage supplied to the components of the display device 102 from the display battery 164. The display recharging port 170 can be used to supply electrical power to the display battery 164 for recharging the display battery 164. The display processor can execute functions to control the various components of the display circuitry 160. The memory of the display circuitry 160 can include software programmed with logic and other algorithmic functions to cause the processor to carry out the functions in a specific manner.

The graphics display 162 can include at least one viewing pane 184. The viewing pane 184 can be a transparent or translucent material such as glass, plastic, plexiglass, etc. In some embodiments, the graphics display 162 can include a plurality of viewing panes 184. For example, the graphics display 162 can include a first viewing pane 184', a second viewing pane 184", etc. Any one or combination of the viewing panes 184 can have a planar shape (e.g., a circular profile with a planar surface on one or both sides, a rectangular profile with a planar surface on one or both sides, a square profile with a planar surface on one or both sides, a triangular profile with a planar surface on one or both sides, etc.). Any one or combination of the viewing panes 184 can be positioned such that its planar surface is perpendicular to the case longitudinal axis 186. The case longitudinal axis 186 can be parallel with the line-of-sight 134 of the rifle 106 when the display device 102 is attached to the rifle 106. In some embodiments, the case longitudinal axis 186 can be co-axial with the line-of-sight 134 of the rifle 106 when the display device 102 is attached to the rifle 106. Thus, any one or combination of the viewing panes 184 can be positioned such that its planar surface is perpendicular to the line-of-sight 134 of the rifle 106 when the display device 102 is attached to the rifle 106.

The exemplary embodiment illustrated in the FIG. 1 shows the graphics display 162 having a first viewing pane 184' and a second viewing pane 184". The first viewing pane 184' has a rectangular shape with a first side surface 188'a and a second side surface 188'b. The first side surface 188'a can be planar. The second side surface 188'b can be planar. The second viewing pane 184" has a rectangular shape with a first side surface 188"a and a second side surface 188"b. The first side surface 188"a can be planar. The second side surface 188"b can be planar. The graphics display 162 can be configured such that each planar surface 188'a, 188'b, 188"a, 188"b of each viewing pane 184', 184" is perpendicular to the line-of-sight 134 when the display device 102 is attached to the rifle 106. The first viewing pane 184' can be positioned such that it is more proximal to the case first end 152 than the second viewing pane 184" is. The second viewing pane 184" can be positioned such that it is more proximal to the case second end 154 than the first viewing pane 184' is. The case 150 can be configured such that its case first end 152 is more proximal to the muzzle end 122 of the rifle 106 when the display device 102 is attached to the rifle 106. The case 150 can be configured such that its case second end 154 is more proximal to the butt end 118 of the rifle 106 when the display device 102 is attached to the rifle 106. Thus, the first viewing pane 184' can be can be positioned such that it is more proximal to the muzzle end 122 of the rifle 106 than the second viewing pane 184" is when the display device 102 is attached to the rifle 106. The second viewing pane 184" can be can be positioned such that it is more proximal to the butt end 118 of the rifle 106 than the first viewing pane 184' is when the display device 102 is attached to the rifle 106.

The first side surfaces 188'a, 188"a of each of the first viewing pane 184' and the second viewing pane 184" can be facing the case first end 152. The second side surfaces 188'b, 188"b of each of the first viewing pane 184' and the second viewing pane 184" can be facing the case second end 154. Any portion of the viewing pane 184 can be made to be reflective, non-reflective, transparent, translucent, be polarized, etc. For example, at least a portion of the first side surface 188'a, 188"a of any viewing pane 184 can be made to be anti-reflective (e.g., apply an anti-reflective coating). At least a portion of the second side surface 188'b, 188"b or any viewing pane 184 can be made to be reflective. With the case 150 being configured such that its case second end 154 is more proximal to the butt end 118 of the rifle 106 when the display device 102 is attached to the rifle 106, at least a portion of the surface of a viewing pane 184 facing the butt end 118 can be made to be reflective. With the case 150 being configured such that its case first end 152 is more proximal to the muzzle end 122 of the rifle 106 when the display device 102 is attached to the rifle 106, at least a portion of the surface of a viewing pane 184 facing the muzzle end 122 can be made to be non-reflective. The anti-reflective coating can be configured to prevent reflection of ambient light. Reflection of ambient light may reveal the user's 101 position if the user 101 is attempting to conceal his or her position.

While various embodiments describe and illustrate the viewing panes 184 to have planar surfaces, other shapes can be used. For example, any one or combination of the first side surface 188'a, 188"a and the second side surface 188'b, 188"b of a viewing pane 184 can have a planar surface, a concave surface, a convex surface, etc. In addition, any portion of the first side surface 188'a, 188"a and/or the second side surface 188'b, 188"b of any viewing pane 184 can be planar while another portion is convex, or concave, etc.

The graphics display 162 can include a display screen 190 and at least one light emitting diode (LED) 192. Any of the LEDs can be an organic LED, or other type of LED known in the art. Some embodiments can include a plurality of LEDs 192. The plurality of LEDs 192 can be arranged to form an LED assembly 194. An LED 192 can be configured to emit a predetermined wavelength of light. This can include a predetermined wavelength within the visible spectrum. Any one or combination of LEDs 192 can be configured to emit a wavelength of light that is the same as or different from a wavelength of light from another LED 192. In some embodiments, the LED assembly 194 can include a first LED 192 configured to emit a first wavelength of light, a second LED 192 configured to emit a second wavelength of light, a third LED 192 configured to emit a third wavelength of light, etc. This can facilitate generating a multicolored LED assembly 194.

The LED assembly 194 can generate at least one wavelength of light based on commands from the display processor. For example, the display processor can receive sensor data from at least one sensor 172, process the sensor data, and transmit electrical signals to the LED assembly 194 via the display circuitry 160. The electrical signals can cause at least one LED 192 of the LED assembly 194 to emit the at least one wavelength of light. The LEDs 192 in the LED assembly 194 can be arranged such that any one or combination of the LEDs 192 can generate a pixel on the display screen 190. More pixels can be generated to provide a display conveying information to a user 101 (e.g., number of rounds remaining in the magazine 138, excess rifle 106 tilt, friend 238 or hostile 240 designation, rifle 106 direction, etc.) looking through the graphics display 162. For example, the display screen 190 can be configured as a beam splitter (e.g., have a reflective coating applied to it) to reflect the wavelengths of light projected upon it from the LEDs 192 but allow other wavelengths of light to pass through it. Thus, the graphics display 162 can be configured as a heads-up-display. Other components such as optical collimators, optical lenses, optical mirrors, optical combiners, etc. can be used to facilitate generating the heads-up-display. Other forms of heads-up-displays can be used, which can include liquid crystal display units, electroluminescent units, cathode fluorescent units, etc.

The display screen 190 can be planar member shaped similarly to that of any of the viewing panes 184. The display screen 190 can have a first side surface 196a and a second side surface 196b. The display screen 190 can be arranged such that its first side surface 196a is adjacent the second side surface 188'b of the first view pane 184' and its second side surface 196b is adjacent the first side surface 188"a of the second viewing pane 184". Thus, in the exemplary embodiment shown in FIG. 1, the first side surface 196a of the display screen 190 can be facing the case first end 152 and the second side surface 196b of the display screen 190 can be facing the case second end 154. This arrangement can allow the heads-up-display to be seen by a user 101 looking through the display device 102 while also looking down the line-of-sight 134 of the rifle 106.

As noted above, the display screen 190 can be adjacent at least one of the viewing panes 184. For example, the display screen 190 can be positioned between the first viewing pane 184' and the second viewing pane 184". Positioning the display screen 190 between the first viewing pane 184' and the second viewing pane 184" can protect the display screen 190 from abrasions and other forms of environmental damage. Some embodiments can include a seal 198 (e.g., a rubber ring) to seal (e.g., prevent intrusion of particles, water, etc.) the display screen 190 between the viewing panes 184 and/or to resist shock.

While various embodiments show the graphics display 162 being housed within a case 150, it is contemplated for the graphics display 162 to be capable of being housed within a scope for the rifle 106. For example, the graphics display 162 can be positioned between the inverted lens and the objective lens of a scope. As another example, the scope housing can serve as the case 150. In such an embodiment, the inverted lens and the objective lens can be the viewing panes 184. It should also be noted that the graphics display 162 does not have to be placed between the viewing panes 184. Thus, the graphics display 162 does not have to be placed between the inverted lens and objective lens of the scope.

Figure 13:
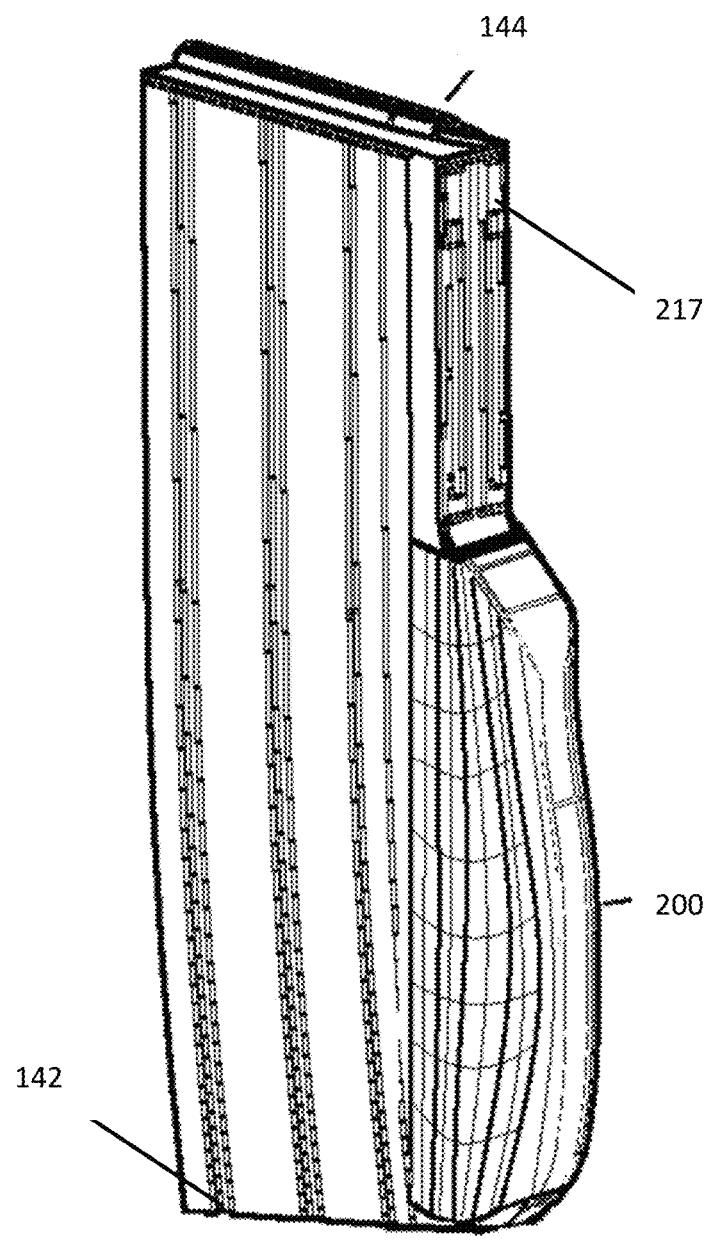
FIGS. 13-14 show an embodiment of a round recorder and an embodiment of a magazine insert sensor that can be used with an embodiment of the system.
Figure 14:
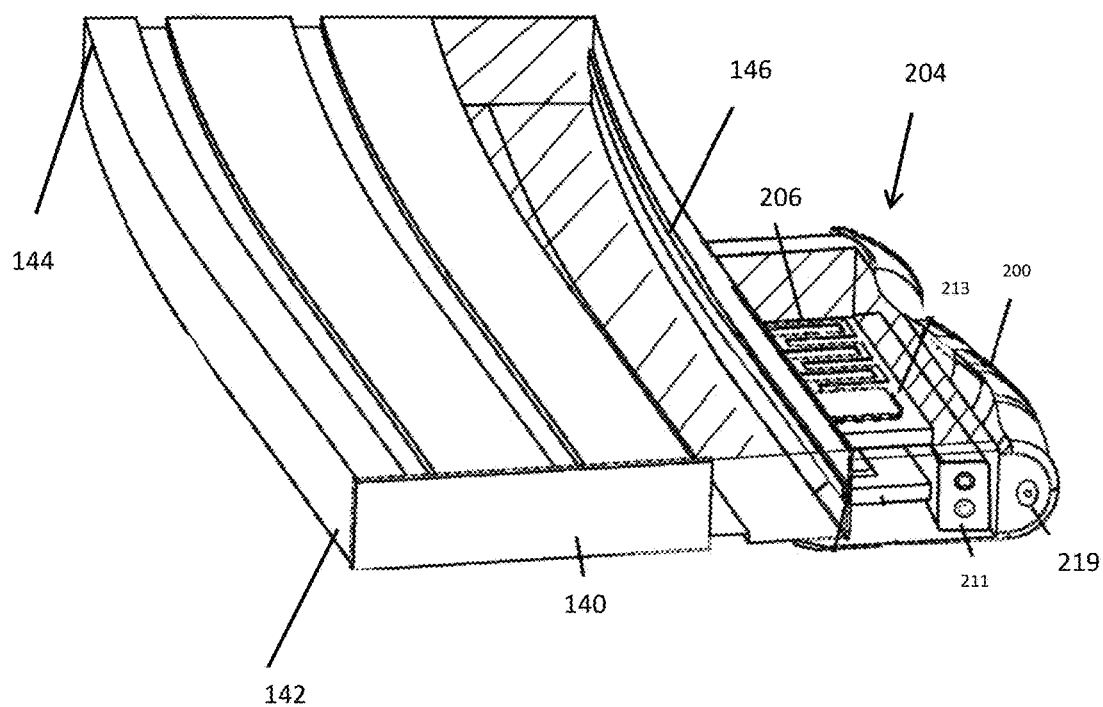
Figure 15:
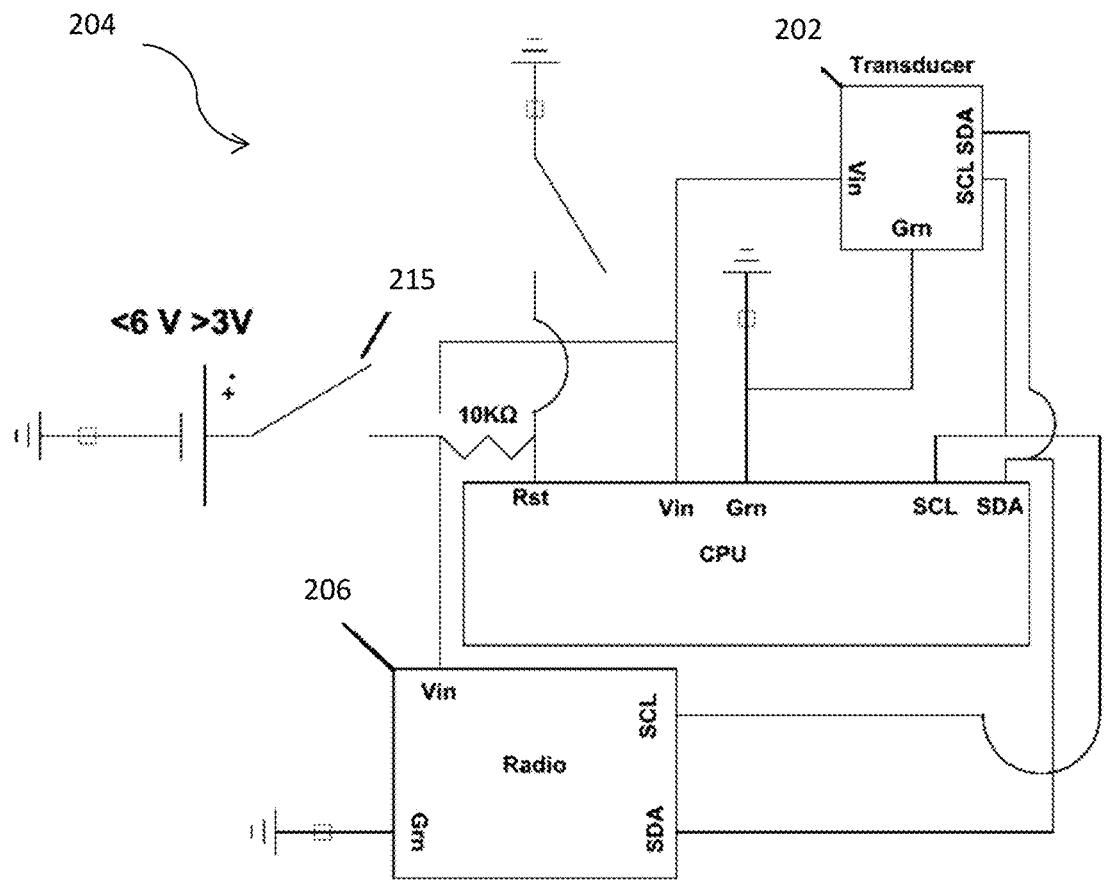
FIG. 15 shows exemplary round recorder circuitry that can be used with the rounder recorder.

Referring to FIGS. 13-15, some embodiments of the system 100 can include a round recorder 200. The round recorder 200 can be a device that is attachable to the magazine 138. As noted herein, the magazine 138 can be a generally rectangular shaped hollow member having a feed end 144 and a base end 142. The magazine 138 can include a spring-loaded foot plate 140 attached to the base end 142, which can be configured to traverse a distance from the base end 142 to the feed end 144. Upon receiving a round through the feed end 144, the foot plate 140 moves towards the base end 142. The more rounds inserted into the magazine 138, the more the foot plate 140 moves towards the base end 142. Once the magazine 138 (having a plurality of rounds within it) is inserted into the magazine well 136, the rifle 106 can cause the rounds to be fired and expelled from the rifle 106. The foot plate 140 then advances towards the feed end 144 to iteratively feed more rounds to the breach 124 for additional firing. The distance the foot plate 140 is from the base end 142 and/or the feed end 144 can be used to determine the number of rounds that are within the magazine 138. Thus, the round recorder 200 can be used to measure this distance and convert the distance to a value that is representative of the number of rounds that are within the magazine 138.

The round recorder 200 can include a round counter 213. The round counter 213 can be a linear transducer, linear encoder, position sensor, displacement sensor, etc. that can be configured to determine the distance the foot plate 140 is from the he base end 142 and/or the feed end 144. This distance can be converted to a value to count or estimate the number of rounds within the magazine 138. The round recorder 200 can include round recorder circuitry 204. For example, the round recorder 200 can be a round counter 213 in operative association with the round recorder circuitry 204. The round recorder circuitry 204 can include a round recorder processor with an associated non-volatile, non-transitory memory. In some embodiments, the round recorder circuitry 204 can be in the form of an integrated circuit. The integrated circuit may include any one or combination of a recharging port 219, round recorder battery 211, round recorder transceiver 206, a round recorder power switch 215, etc. In one embodiment, the round recorder 200 can be a thin film touch potentiometer attached to an inside portion of the magazine 138. For example, the potentiometer can be attached to surface of the foot plate guiding well 146 of the magazine 138. The potentiometer can be configured to generate a signal based on the distance the foot plate 140 is from the base end 142 and/or the feed end 144. As the foot plate 140 moves, either towards or away from the potentiometer, the potentiometer can generate the distance signal. With the known dimensions of the magazine 138 and the known number of rounds that would cause the foot plate 140 to move a certain distance based on the number of rounds inside the magazine 138, the distance signal can be used to determine the number of rounds within the magazine 138. Thus, the distance signal can be converted into a round count signal.

The components of the round recorder 200 can be placed into electrical connection with each other. For example, the round recorder processer can be powered by the round recorder battery 211, wherein a voltage regulator can regulate the power to the round recorder circuitry 204. The round recorder 200 can be turned on and off via the round recorder power switch. For example, activating the round recorder power switch can cause the voltage regulator to modify the voltage supplied to the components of the round recorder 200 from the round recorder battery 211. The round recorder recharging port 219 can be used to supply electrical power to the round recorder battery 211 for recharging the round recorder battery 211. The round recorder processor can execute functions to control the various components of the round recorder circuitry 204. The memory of the round recorder circuitry 204 can include software programmed with logic and other algorithmic functions to cause the processor to carry out the functions in a specific manner.

The round count signal can be transmitted by the round recorder transceiver 206 to the display transceiver 168. The display transceiver 168 can transmit the round count signal to the display processor for storage in the memory, processing, and/or display on the graphics display 162. It should be noted that round recorder 200 can count the number of rounds in the magazine 138 regardless of whether the magazine 138 is inserted into the rifle 106. Previous attempts to keep track of a user's 101 remaining rounds of ammunition require the magazine 138 to be inside the magazine well 136 of the rifle 106. In contrast, the system 100 can keep track of each magazine 138 and the rounds in the magazine 138, regardless of whether the magazine 138 is inserted in the magazine well 136. This can provide logistical advantages for the user 101 and for other users 101 using similar devices 102 that are in communication with each other. In addition, a user 101 can have more than one magazine 138 in his or her inventory. Each magazine 138 can include a round recorder 200 that can transmit round count signals to the display device 102. Thus, the system 100 can be used to track the number of rounds in a plurality of magazines 138. Each magazine 138 can be first set up to communicate with the display device 102 via a communication link. This can be done to establish a network 110 between the display device 102 and each magazine 138.

As will be discussed herein, other devices can be placed into communication with the display device 102. In addition, a display device 102 can be placed into communication with another display device 102. In addition, any one or combination of display devices 102 or other components of the system 100 can be placed into communication with other devices (e.g., computer devices, computer systems, servers, computer networks, etc.). For example, any of the display devices 102 or other components of the system 100 can be placed into communication with a drone or other unmanned aerial vehicle that may be used to provide aerial surveillance information for the users 101 of the system 100. As another example, any of the display devices 102 or other components of the system 100 can be placed into communication with an intelligence computer system. For example, users 101 may be soldiers on the battle field and the information from their display devices 102 can be transmitted to the intelligence computer system to provide intelligence and other tactical information to commanders. Any of the signals or other data that are transmitted from any component of the system 100 to another component of the system 100 or to another device outside the system 100 can be encrypted by the processors of the component before being transmitted by the transceiver associated with that component.

Some embodiments of the system 100 can include a magazine insert sensor 217. The magazine insert sensor 217 can be a device that is attachable to a portion of the magazine 138 or the magazine well 136. The magazine insert sensor 217 can be configured to determine when the magazine 138 is inserted into the magazine well 136. Upon detecting the magazine 138 being inserted into the magazine well 136, the magazine sensor 172 can generate a magazine insert signal. The magazine insert signal can be transmitted to the display device 102. Receiving the magazine insert signal can be an indicator that the magazine 138 is inserted into the magazine well 136. The absence of the magazine insert signal can be an indicator that the magazine is not inserted into the magazine well 136.

As a non-limiting example, the magazine insert sensor 217 can be a Hall Effect sensor attached to the magazine 138. This can include attaching the magazine insert sensor 217 to an outside surface portion of the magazine 138 at or near the feed end 144. Alternatively, the magazine insert sensor 217 can be attached to the magazine well 136. This can include attaching the magazine inset sensor 172 to an inside surface 137 portion of the magazine well 136 (see FIG. 7). With the magazine insert sensor 217 being a hall effect sensor, the output of the sensor 172 can change due to a change in magnetic field caused by the proximity with which the magazine insert sensor 217 is with the magazine 138 or the magazine well 136 when the magazine 138 is inserted into the magazine well 136. This change in output can cause the magazine sensor 172 to generate the magazine insert signal.

The magazine insert sensor 217 can include magazine insert circuitry. For example, the magazine insert sensor 217 can include a magazine insert processor with an associated non-volatile, non-transitory memory. The magazine insert circuitry can also include any one or combination of a magazine insert battery, a magazine insert power switch, a magazine insert transceiver, and a magazine insert recharging port. The components of the magazine insert sensor 217 can be placed into electrical connection with each other. For example, the magazine insert processer can be powered by the magazine insert battery, wherein a voltage regulator can regulate the power to the magazine insert circuitry. The magazine insert can be turned on and off via the magazine insert power switch. For example, activating the magazine insert power switch can cause the voltage regulator to modify the voltage supplied to the components of the magazine insert from the magazine insert battery. The magazine insert recharging port can be used to supply electrical power to the magazine insert battery for recharging the magazine insert battery. The magazine insert processor can execute functions to control the various components of the magazine insert circuitry. The memory of the magazine insert circuitry can include software programmed with logic and other algorithmic functions to cause the processor to carry out the functions in a specific manner. The magazine insert signal can be transmitted by the magazine insert transceiver to the display transceiver 168. The display transceiver 168 can transmit the magazine insert signal to the display processor for storage in the memory, processing, and/or display on the graphics display 162.

Figure 16:
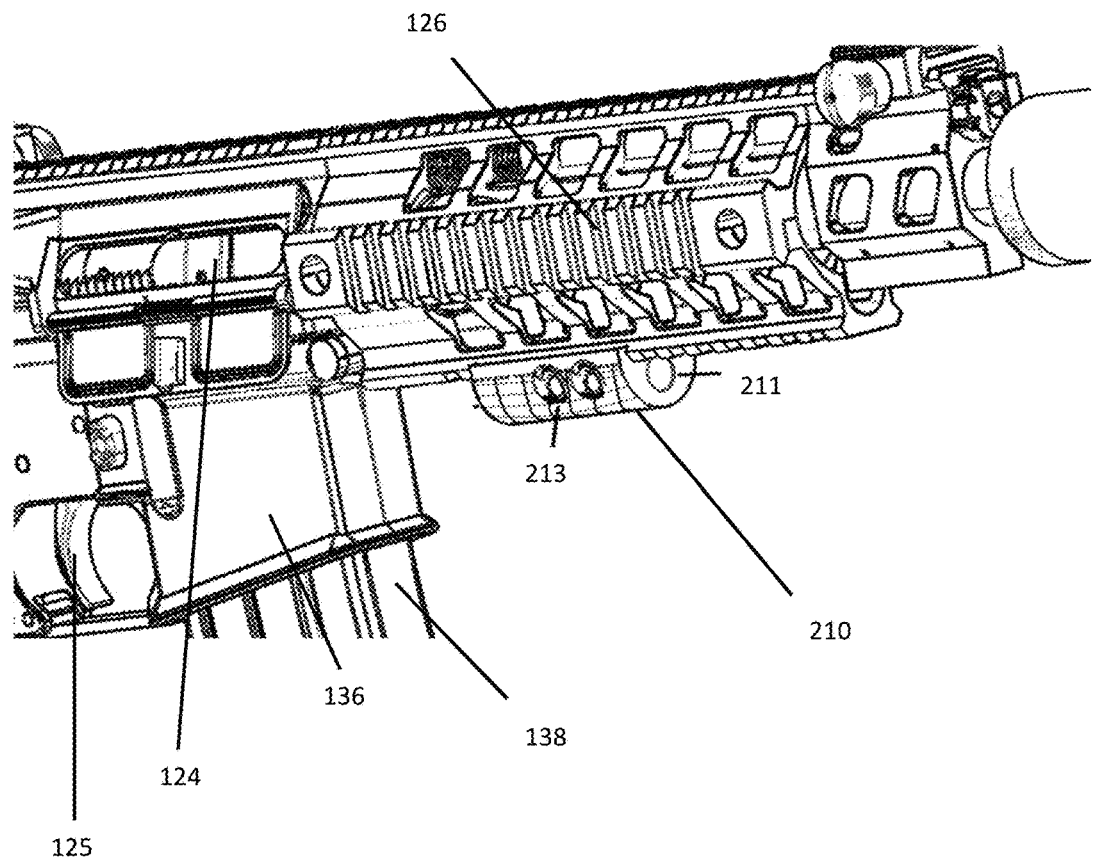
FIG. 16 shows an embodiment of a range finder that can be used with the system.

Referring to FIG. 16, some embodiments of the system 100 can include a range finder 210. The range finder 210 can be a device that is attachable to a portion of the rifle 106. For example, the range finder 210 can be attached to a portion of the handguard 126. The range finder 210 can be attached via a mount, which may be a pitcatinny mount, weaver mount, etc. The exemplary embodiments disclosed herein shows the range finder 210 attached to the rifle 106; however, the range finder 210 can be a stand-alone device. The range finder 210 can be configured to use ranging techniques to determine a distance between it and a target. Ranging techniques can include use of LASER ranging, RADAR ranging, LIDAR ranging, etc. Methods for obtaining a distance from the ranging techniques can include coincidence, triangulation, time of flight, etc.

The range finder 210 can include range finder circuitry that can be in electrical connection with a range finder processor having an associated non-volatile, non-transitory memory. Optical components 211, user interfaces 213, and other circuitry known to those skilled in the art can be part of the range finder 210 to facilitate ranging. The user interface 213 can include actuation and control buttons to allow a user to control the functions of the range finder 210. Range finder circuitry can include any one or combination of a range finder battery, a range finder power switch, a range finder transceiver, and a range finder recharging port. These components can be placed into electrical connection with each other. For example, the range finder processer can be powered by the range finder battery, wherein a voltage regulator can regulate the power to the range finder circuitry. The range finder 210 can be turned on and off via the range finder power switch. For example, activating the range finder power switch can cause the voltage regulator to modify the voltage supplied to the components of the range finder 210 from the range finder battery. The range finder recharging port can be used to supply electrical power to the range finder battery for recharging the range finder battery. The range finder processor can execute functions to control the various components of the range finder 210. The memory of the range finder 210 can include software programmed with logic and other algorithmic functions to cause the processor to carry out the functions in a specific manner.

Some embodiments of the range finder 210 can provide more than one mode of operation, which can be achieved via the software stored in the range finder memory unit. For example, the range finder 210 can be used for ranging, generating geographical maps of the field of view (or at least data for generating the same), Circular Error Probable (CEP) displays (or at least data for generating the same—see FIG. 12), etc. The information generated from the range finder 210 can be referred to as ranging data. The ranging data can be transmitted from the range finder transceiver to the display transceiver 168. The display transceiver 168 can transmit the ranging data to the display processor for storage in the memory, processing, and/or display on the graphics display 162.

Figure 17:
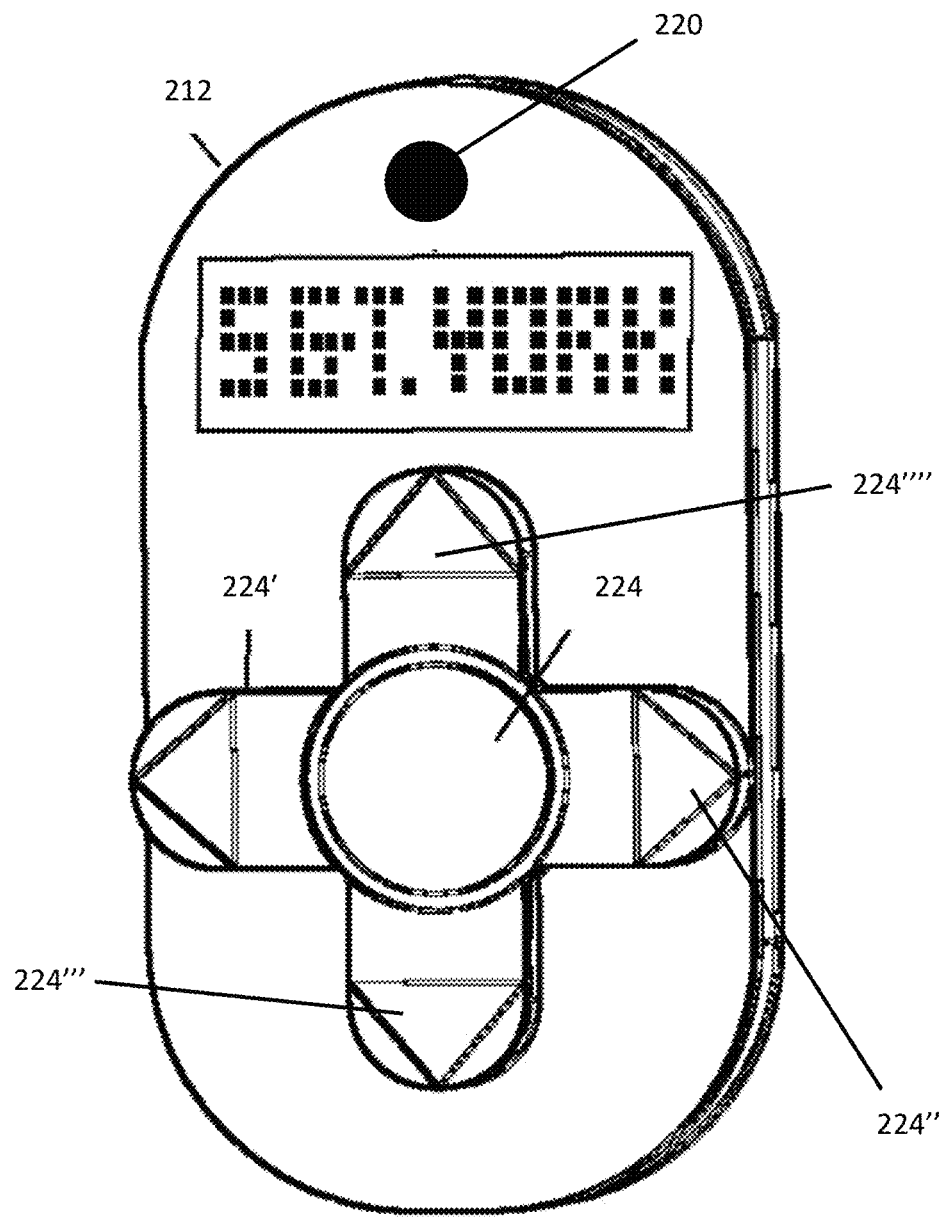
FIGS. 17-18 show embodiments of a fob that can be used with the system.
Figure 18:
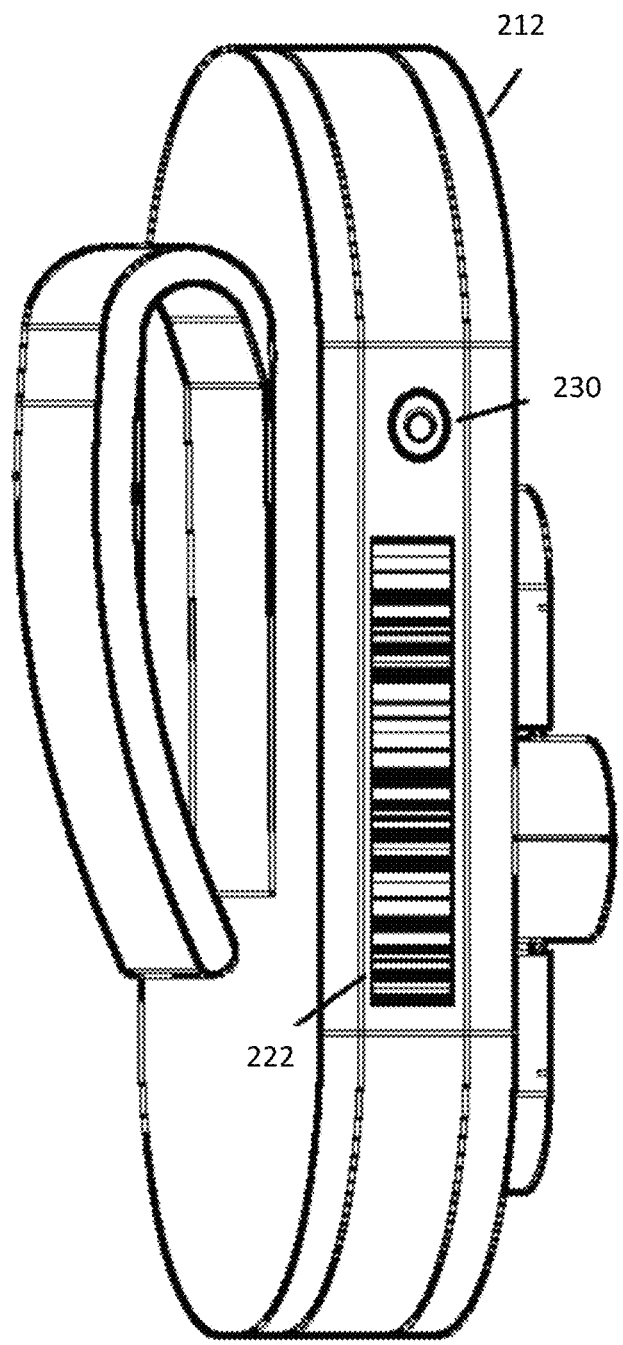
Figure 19:
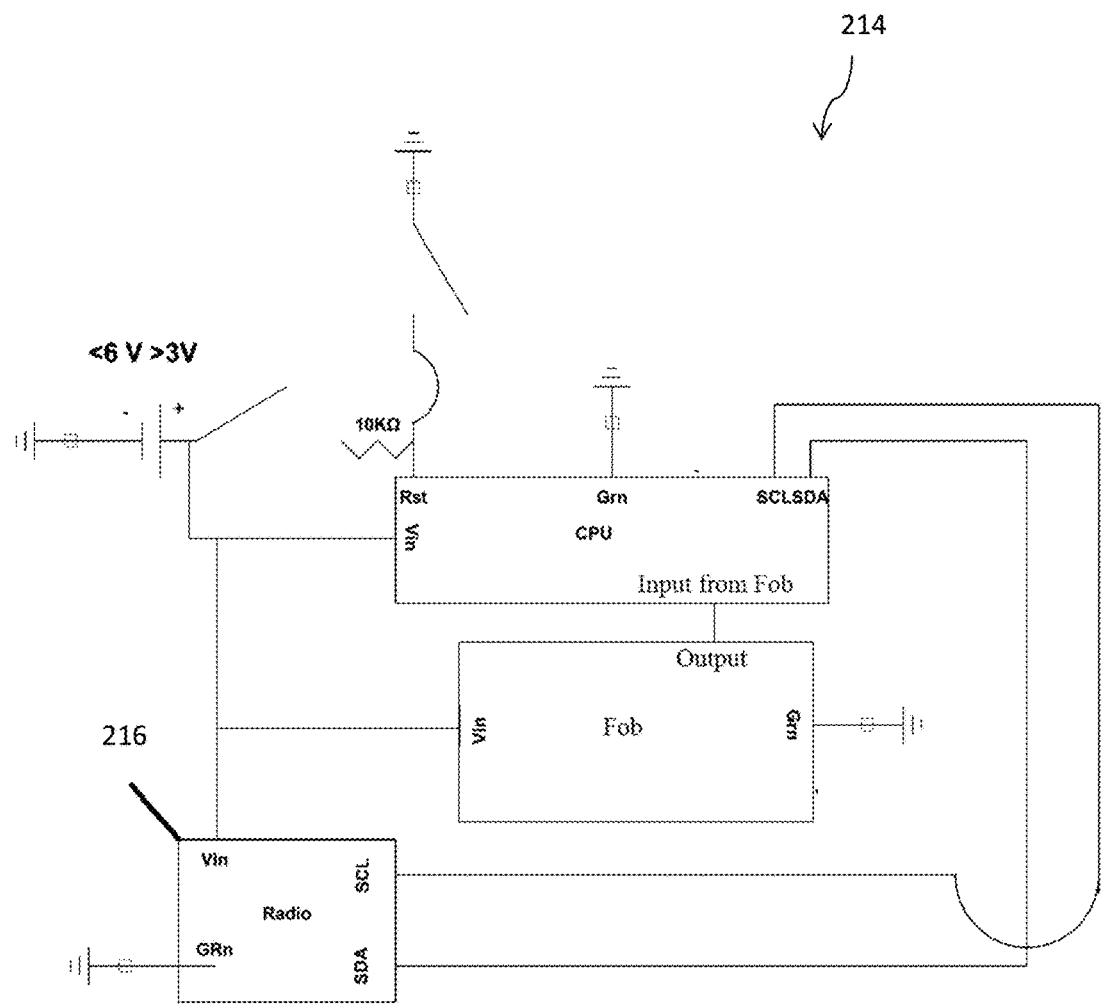
FIG. 19 shows exemplary fob circuitry that can be used with the fob.

Referring to FIGS. 17-19, some embodiments of the system 100 can include an electronic controller 212 such as a token, a fob, etc. While exemplary embodiments show the electronic controller as a fob 212, it is understood that other forms of electronic controllers can be used. The fob 212 can be a device that is capable of being in electrical communication with the display device 102 and/or other component of the system 100. The fob 212 can be configured to allow a user 101 to input data and to enter commands (e.g., commands to control the fob 212 and other components of the system 100) to be transmitted to the display device 102 and/or other components of the system 100. For example, the fob 212 can allow a user 101 to control operating parameters of the display device 102 and/or other component of the system 100 (e.g., turn the component of the system 100 on and off, disable or enable certain components, disable or enable certain functions of certain components, etc.). The fob 212 can also allow a user 101 to input data such as other assets 104 in the user's 101 inventory, the health status of the user 101, the location of the user 101, etc.

The fob 212 can include fob circuitry 214 that can be in electrical connection with a fob processor having an associated non-volatile, non-transitory memory. Electrical components, user interfaces, and other circuitry known to those skilled in the art can be part of the fob 212 to facilitate data input and data transmission. The fob circuitry 214 can include a fob battery, a fob power switch, a fob transceiver 216, and a fob recharging port. These components can be placed into electrical connection with each other. For example, the fob processer can be powered by the fob battery, wherein a voltage regulator can regulate the power to the fob circuitry 214. The fob 212 can be turned on and off via the fob power switch. For example, activating the fob power switch can cause the voltage regulator to modify the voltage supplied to the components of the fob 212 from the fob battery. The fob recharging port can be used to supply electrical power to the fob battery for recharging the fob battery. The fob processor can execute functions to control the various components of the fob 212. The memory of the fob 212 can include software programmed with logic and other algorithmic functions to cause the processor to carry out the functions in a specific manner. The information generated from the fob 212 can be referred to as fob data. The fob data can be transmitted from the fob transceiver 216 to the display transceiver 168. The display transceiver 168 can transmit the fob data to the display processor for storage in the memory, processing, and/or display on the graphics display 162.

While the disclosure refers to the electronic controller 212 as a fob, any similar functioning electronic controller 212 can be used. Thus, the electronic controller 212 can include electronic controller 212 circuitry 214, an electronic transceiver 216, and the other circuitry and other components described above.

Figure 20:
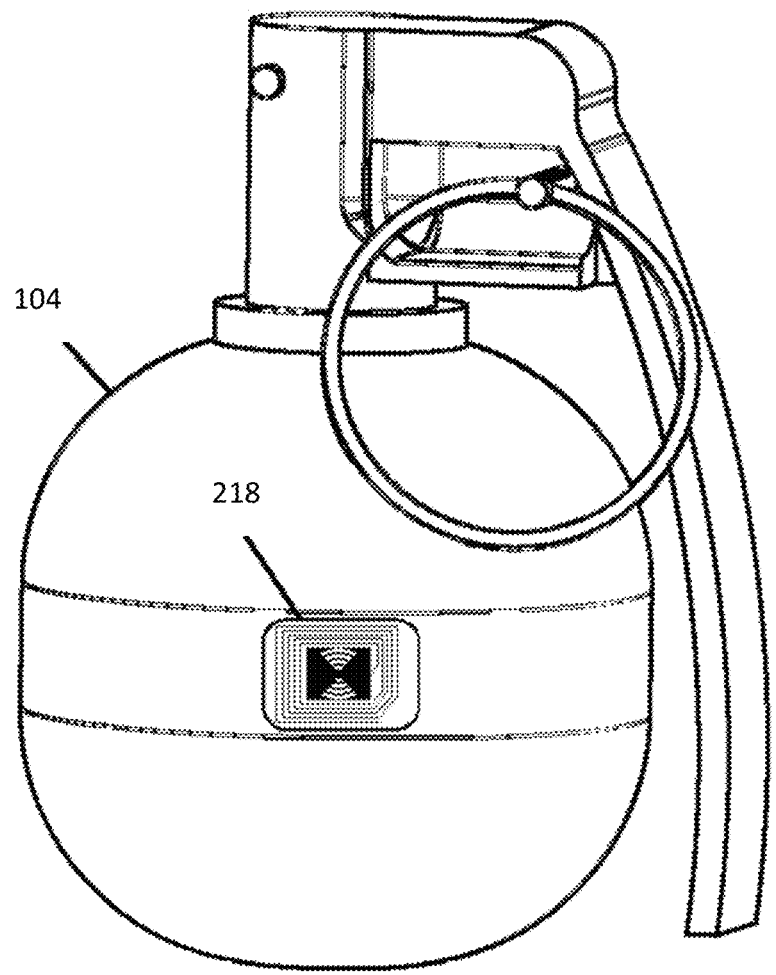
FIG. 20 shows an asset that can be associated with a user via an RFID tag.
Figure 21:
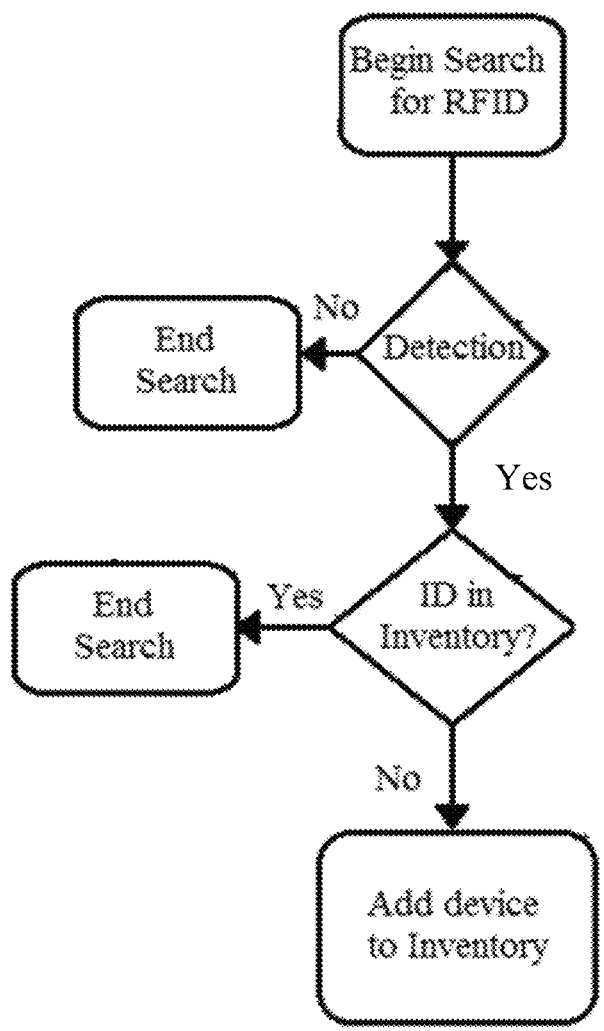
FIG. 21 shows an exemplary process flow of a search function performed by the system.

Referring to FIGS. 20-21, some embodiments can include the use of radio frequency identification tags (RFID tags) 218. These can be attached to, or otherwise be associated with, an asset 104 in a user's 101 inventory, a component of the system 100 (a display device 102, a range finder 210, the weapon 106, etc.), and/or to the user 101. The display device 102 and/or the fob 212 can include an RFID scanner 220. The RFID scanner 220 can scan for the RFID tag 218 associated with an asset 104. If the RFID tag 218 of an asset 104 can be detected (e.g., it is in the range of the RFID scanner 220), the asset 104 can be added to a user's 101 inventory. A user's 101 inventory can be a virtual log of the user's 101 assets 104. If the assets 104 was already part of the user's inventory but the RFID tag 218 of that asset 104 can no longer be detected (e.g., it is out of the range of the RFID scanner 220), then it can be removed from a user's 101 inventory. As will be explained, other control parameters can be used to determine when an asset 104 is removed or added to a user's 101 inventory. The addition and removal of the assets 104 from the user's 101 inventory can be done automatically by the display processor and/or fob processor. This can also be done manually by a user 101 entering such information via the fob 212.

Some assets 104, such as grenades for example, can be expendable. Once the asset 104 is used (e.g., destroyed), the asset 104 is then no longer "in range" of the RFID scanner 220. This can cause the display processor to remove the asset 104 from the user's 101 inventory. While the RFID tags 218 can be used to track assets 104 such as munitions and medical equipment, other assets 104 that can be tracked can be the weapon 106, the range finder 210, the display device 102, the fob 212, and even the user 101 him/herself.

Figure 24:
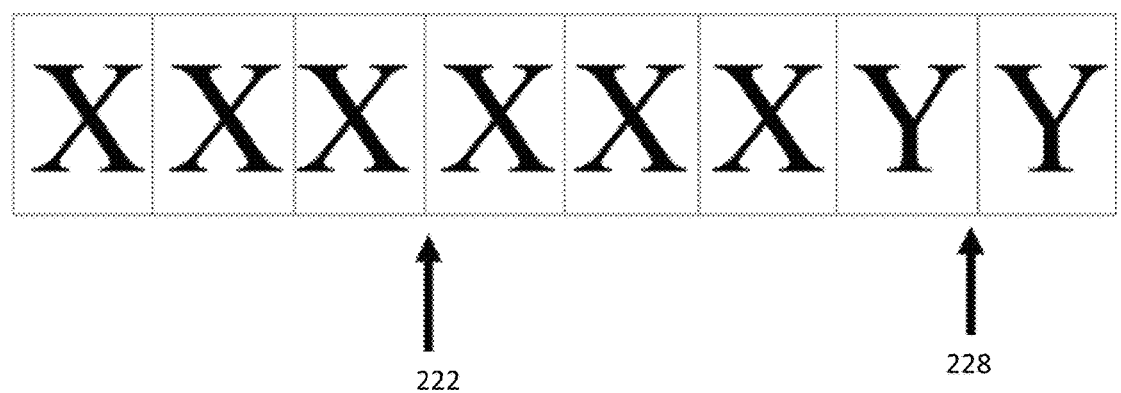
FIG. 24 shows an exemplary unique identifier that can be used with the system.

FIG. 20 shows a basic flowchart of how a system 100 can add an asset 104 associated with an RFID tag 218 to a user's 101 inventory. In one embodiment, a user 101 can cause the fob 212 to begin a search for RFID tags 218 by actuating the synchronization button 230. The RFID scanner 220 of the fob 212 can begin searching for any RFID tags 218 within range. If no RFID tags 218 are detected, the fob 212 can return to a default operation (which may be a non-scanning function). If the RFID scanner 220 of the fob 212 detects an RFID tag 218, the fob 212 can proceed to verify that the assets 104 should be added to the inventory of the user 101 by comparing acquisitioning a unique identifier 222 (see FIG. 24). The use of the unique identifier 222 will be explained in more detail later. If the fob 212 detects that the asset 104 is within the user's 101 inventory, and there are no other RFID tags 218 detected, the RFID scanner 220 of the fob 2112 can end the search. If the fob 212 detects that the asset 104 is not already within the user's 101 inventory, the system 100 can record the assets 104 as being part of the user's 101 inventory.

The fob 212 can be programmed such that once the fob 212 adds an asset 104 to the user's 101 inventory, the fob 212 can conduct a search for the asset 104 (via a scan of the asset's 104 RFID tag 218) on a periodic time schedule. This can be done to determine if the asset 104 is still within the user's 101 inventory. In some embodiments, the asset 104 can be identified by the system 100 as being within the user's 101 inventory until the fob 212 can no longer find the RFID tag 218 associated with that asset 104. In some embodiments, the system 100 can be configured to identify the asset 104 as being used or lost when the RFID tag 218 of that asset 104 cannot be located after a grace period (e.g., after certain amount of time after which the system 100 cannot find the RFID tag 218 associated with that asset 104, after a certain number of times the scanner 220 searched for it but could not find the RFID tag 218 associated with that asset 104, etc.). Once the asset 104 is identified as being used or lost, the system 100 can remove the asset 104 from the user's 101 inventory.

Figure 22:
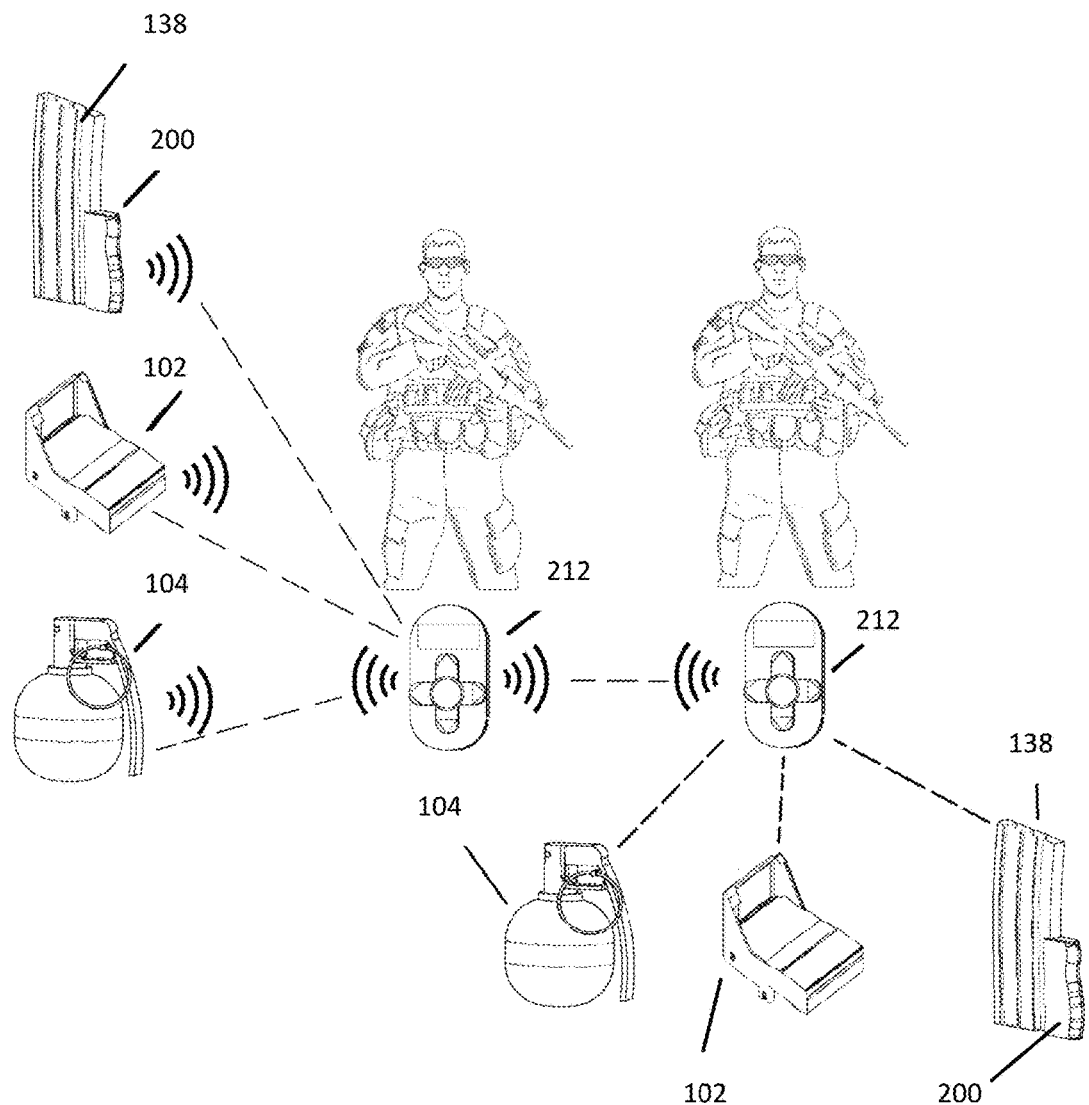
FIG. 22 is an exemplary demonstration of how assets can be added to the inventory of a user via the system.

In addition, the fob 212 can be used to allow a user 101 to add or remove assets 104 from the user's 101 inventory (see FIG. 22). For example, the fob 212 can include a user interface to allow a user to enter data related to the assets 104 within his or her inventory. This can include adding or removing assets 104, regardless of them having an RFID tag 218 associated with them and/or regardless of them being in or out of range of the RFID scanner 220. For example, an asset 104 may be in range of the RFID scanner 220 but may be inoperable. The user 101 can then remove the asset 104 from the user's 101 inventory via the fob 212. As another example, a user 101 may acquire an asset 104 that does not have an RFID tag 218, or has an RFID tag 218 but the RFID tag 218 itself is inoperable. A user 101 can then add that asset 104 to the inventory via the fob 212. It should be noted that the number of rounds a user 101 has (whether in the magazine or not) can be part of a user's 101 inventory. The number of rounds in a user's inventory can be provided to the fob 212 via the round recorder 200, for example. The number of rounds can also be modified based on a user's input via the fob 212.

In addition, the fob 212 can also be used to track and/or enter other information about the user 101. This can include the user's 101 name, health status, blood type, user 101 records, time of operation, location of the user 101, etc. For example, the fob 212 can include a user interface to allow a user to enter data related to him/herself.

The fob data can include the user's 101 inventory information and other user 101 information generated and tracked by the fob 212. As noted above, the fob data can be transmitted from the fob transceiver 216 to the display transceiver 168. The fob data can be displayed via the display device 102. The fob data can also be transmitted to other user 101 display devices 102 or to another device outside of the system 100 when the user 101 and the user's 101 devices are connected to the network 110 for communication with other users 101 and user 101 devices.

Any of the components of the system 100 (e.g., weapon 106, the assets 104, the magazine 138, the fob 212, the display device 102, the range finder 210, the magazine insert sensor 217, RFID tag 218, etc.) can be associated with a user 101. For example, a user 101 can be provided with a unique identifier 222 (e.g., a code, numerical value. alphanumeric value, etc.) that can be entered or programmed into any component of the system 100 (see FIG. 24). The components having the unique identifier 222 can then be associated with the user 101 by requiring the user 101 to transmit his or her unique identifier 222 to the component before the component can be operated. As a non-limiting example, the user's 101 fob 212 can be used as an identifier of the user 101 by transmitting the user's 101 unique identifier 222 to components within a predetermined range of the fob 212. Once the component receives the matching unique identifier, the component can become operable to allow a user 101 to use it. If the component receives a non-matching unique identifier, the component can become inoperable. Thus, the system 100 can be configured to prevent use of any component unless the user 101 is identified via the fob 212. In some embodiments, a component of the system 100 may be programmed to disable or de-activate its transceiver, processor, or other element unless it receives a unique identifier 222 from the fob 212 that matches the unique identifier 222 that was programmed into that component.

In some embodiments, the fob 212 can be used to control components of the system 100. For example, a user 101 can use his or her fob 212 to turn certain components on or off, activate or de-activate elements of components, etc. For example, the fob 212 can be provided with a component activation button 224. Actuating the component activation button 224 can cause the component to turn on, activate, allow transmission of data from that component's transceiver, etc. Actuating the component activation button 224 again can cause the component to turn off, de-activate, prevent transmission of data from that component's transceiver, etc. For example, the fob 212 can have a display device activation button 224', a range finder activation button 224", a round recorder activation button 224''', a magazine insert activation button 224'''', etc. Actuating the display device activation button 224' can cause the activation or de-activation of the display device 102. Actuating the range finder activation button 224" can cause the activation or de-activation of the range finder 210. Actuating the round counter activation button 224''' can cause the activation or de-activation of the round recorder 200. Actuating the magazine inset activation button 224'''' can cause the activation or de-activation of the magazine insert sensor 217. The description and illustration of the activation buttons are exemplary only. Other activation buttons, other control mechanisms, and other components to be controlled via the fob 212 can be used.

Figure 23:
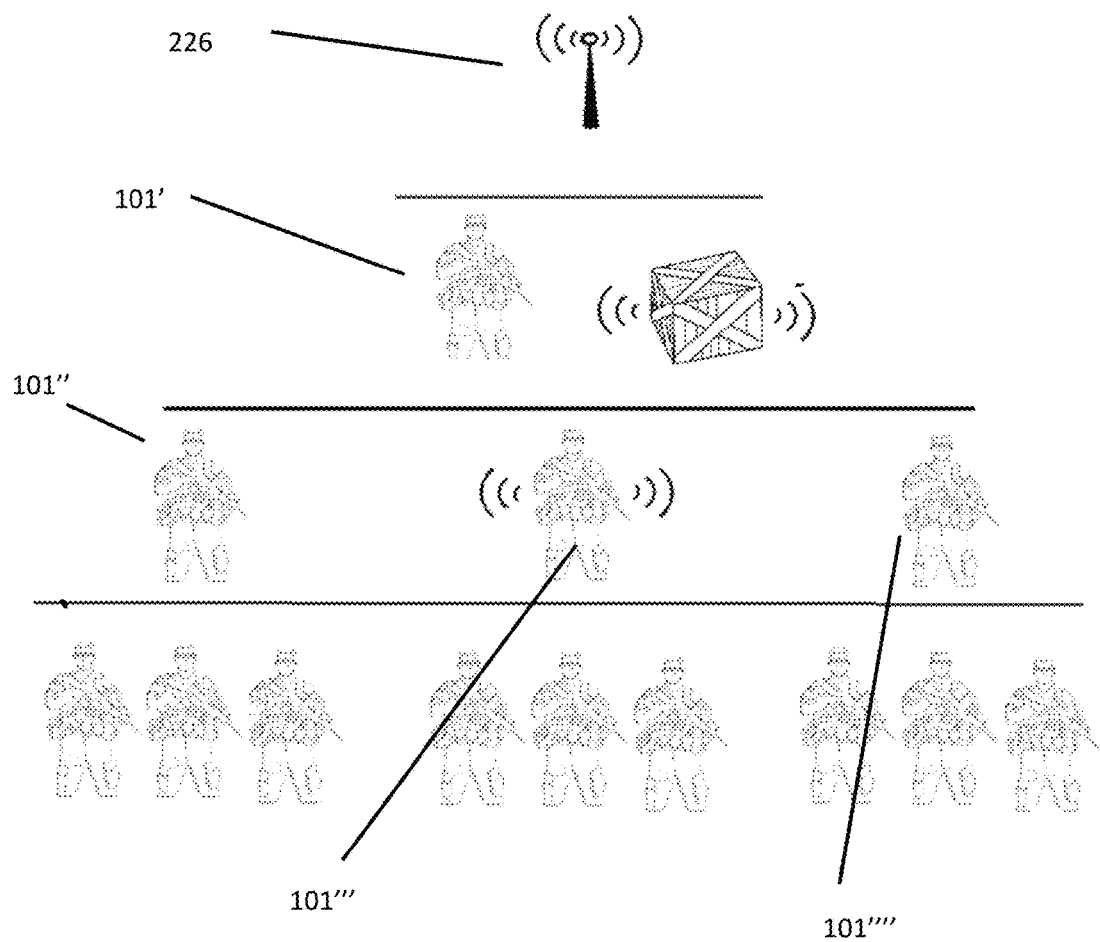
FIG. 23 is an exemplary demonstration of a hierarchy of operational control that can be established between users of the system.

Referring to FIGS. 23-26, as noted above, multiple users 101 can communicate with each other (e.g., each user's 101 display device 102 can transmit data between each display device 102) to form a network 110. For example, a first user 101' can be associated with a first display device 102 and other first user 101' components, a second user 101" can be associated with a second display device 102 and other second user 101 components, and a third user 101''' can be associated with a third display device 102 and other third user 101" components, a fourth user 101'''' can be associated with a fourth display device 102 and other first user 101'''' components. More or less users 101 and user 101 devices can be part of the network, as illustrated in FIG. 23. Any of the data transmitted to the users' 101 display devices 102 can also be transmitted to each other's display device 102. For example, any portion of the first user's 101' data can be transmitted and displayed on the second user's 101" display device 102 and/or the third user's 101''' display device 102 and/or fourth user's 101'''' display device 102. Any portion of the second user's 101" data can be transmitted and displayed on the first user's 101' display device 102 and/or the third user's 101''' display device 102 and/or fourth user's 101'''' display device 102. Any portion of the third user's 101''' data can be transmitted and displayed on the first user's 101' display device 102 and/or the second user's 101" display device 102, and/or fourth user's 101'''' display device 102. Any portion of the fourth user's 101'''' data can be transmitted and displayed on the first user's 101' display device 102 and/or the second user's 101" display device 102, and/or third user's 101''' display device 102.

In addition, a third-party device 226 can be included with the network 110. The third-party device 226 can be a computer device, a computer server, a drone or some other autonomous vehicle, a satellite, etc. The third-party device 226 can receive data from and to any of the user display devices 102 on the network 110. The third-party device 226 can transmit third-party data to any of the user display devices 102 on the network 110. Third-party data can include surveillance data of the field of view, identification of friendlies 238, identification of hostiles 240, information about other users, etc. The transmission to and from the third-party device 226 can be achieve via a third-party transceiver. In some embodiments, the third-party device 226 can exercise command and control of individual user 101 display devices 102 or other user 101 components. For example, a third-party device 226 can cause any user 101 display device 102 or user 101 component to turn on/off, activate/de-activate, permit/prevent transmission of data, etc.

A hierarchy of operational control can be established with many users 101. This can facilitate sharing and displaying user 101 data among the various users 101 of the network discriminatorily and also allow users 101 to exercise control over other user's 101 display devices 102 and components. For example, a user's 101 unique identifier 222 can include a control level indicator 228. The control level indicator 228 can be a code, numerical value, or alphanumeric value that represents the level of control the user 101 is permitted to exercise over other user's 101 components (e.g., cause any user 101 display device 102 or user 101 component to turn on/off, activate/de-activate, permit/prevent transmission of data, etc.). The system 100 can be configured to identify users 101 (e.g., higher level user) with control level indicators 228 greater than the control level indicators 228 of other users (e.g., lower level users) as a user 101 who can exercise control over the lower level users. For example, as shown in FIG. 23, a first user 101' may be a person of higher rank than those of the second, third, and fourth users 101", 101''', 101''''. The second, third, and fourth users 101", 101''', 101'''' may be of equal rank. In this example, the first user's 101' unique identifier 222 can include a control level indicator 228 of 10 and the second, third, and fourth user's 101", 101''', 101'''' unique identifiers can include a control level indicator 228 of 8. A control level indicator 228 of 10 is higher than a control level indicator 228 of 8, and thus the system 100 can identify the first user 101' as a person that is able to exercise control over the second, third, and fourth user 101", 101''', 101'''' display devices 102 and other components of the second, third, and fourth users 101", 101''', 101''''. Because the second, third, and fourth user's 101", 101''', 101'''' control level indicator 228s are 8, none can exercise control over the first user's 101' display device 102 and other components of the first user 101'. The system 100 can also be configured to prevent any user 101 having the same control level indicator 228 from exercising control over another user 101 having the same control level indicator 228. Thus, with the example above, none of the second, third, or fourth users 101", 101''', 101'''' can exercise control over each other's display devices 102 and components.

The system 100 can also be configured to set a threshold control level indicator 228 value by which a user 101 must have in order to exercise control over other user's 101 display devices 102 and components. For example, the system 100 can be configured to only allow a user 101 with a control level indicator 228 of 10 or higher to exercise control over other users' 101 display devices 102 and components. Thus, with such a scheme, if a user 101 has a control level indicator 228 value that is less than 10, he or she cannot exercise control over any other user's 101 display device 102 and components, regardless of his or her control level indicator 228 being higher than the other user's 101.

In addition, system 100 can be configured to display user 101 data discriminatorily based on the control level indicators 228. For example, while user 101 data from each user 101 on the network 110 can be shared among the different user 101 display devices 102 on the network 110, the user 101 data about lower level users 101 displayed on the display devices 102 of higher level users 101 can be different from the user 101 data about higher level users 101 displayed on the display devices 102 of lower level users 101. As a non-limiting example, the first user 101' may have a supply cache within his or her inventory. The details of the supply cache need to be communicated to the second, third, and/or fourth user 101", 101''', 101''''. Thus, only the first user 101 and other users 101 having control level indicators equal to or greater than that of the first user 101 can view the information related to the supply cache.

It should be noted that the control level indicator 228 schemes disclosed above are exemplary only, and that other control level values, schemes, comparisons, etc. can be used.

Figure 25:
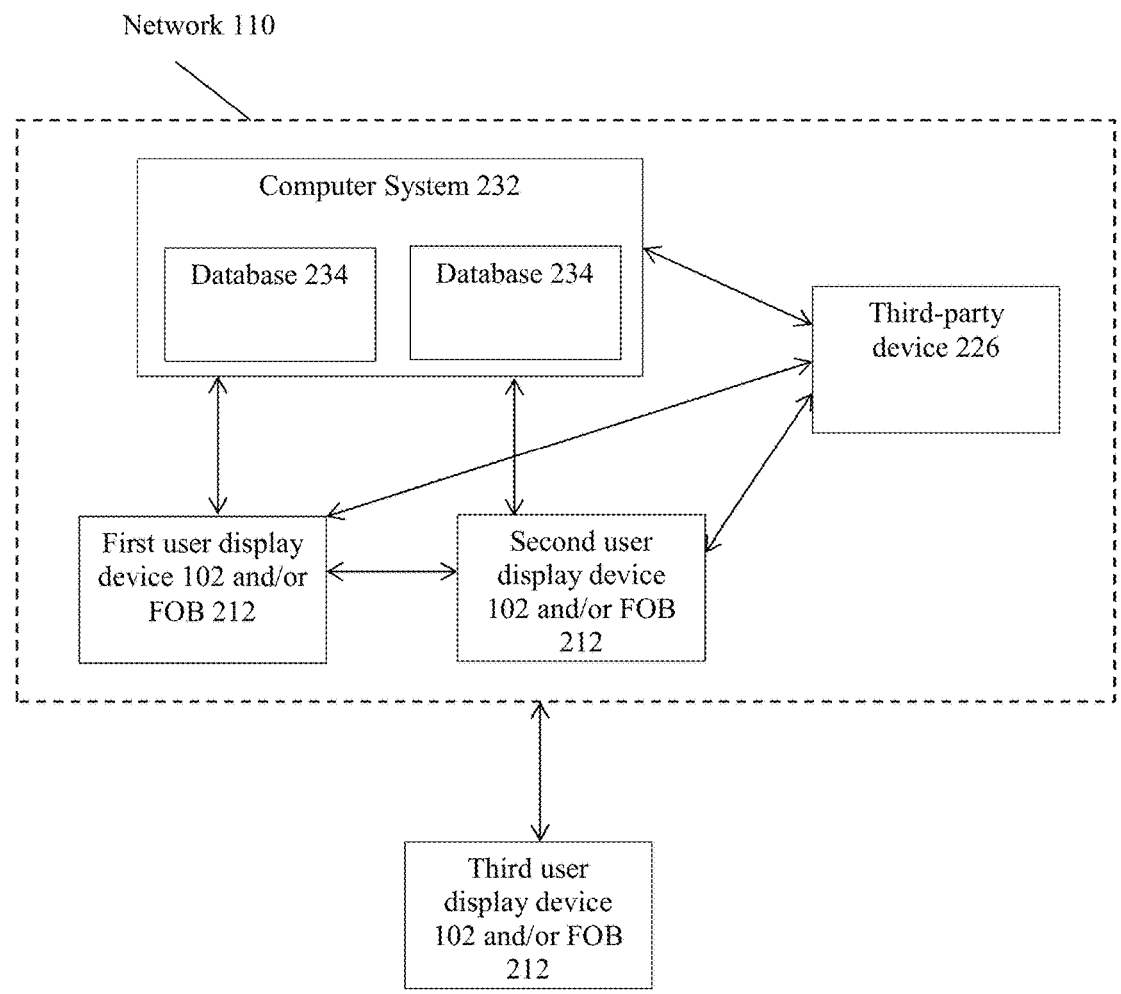
FIG. 25 shows block diagram of an exemplary network that can be established between user devices of the system.

Referring to FIG. 25, establishing the network 110 can hierarchy of operational control can be achieved via the fob 212 of a user 101. For example, the fob 212 can include a synchronization button 230. The synchronization button 230 can be connected to wireless communications circuitry, which may include transceivers, gateways, routers etc. Upon actuation of the synchronization button 230, the wireless communications circuitry can search for and connect to other user 101 FOBs 212. This can be achieved via a wireless mesh technique to generate a wireless mesh communication topology with each other fob 212 (e.g., each fob 212 can be a "client" or a "node" of the mesh topology). The third-party user 101 device 226 can also join the network 110 in a similar fashion. FIG. 25 shows a network between a first user 101' device 102, a second user 101" device 102, and a third-party device 226. The third user 101''' device 102 is attempting to join the network 110. Establishing mesh topologies and other forms of communication networks are known to those skilled in the art. Once the fob 212 becomes a node of the communication network, the system 100 can compare control level indicator 228s and establish the hierarchy of operational control.

As seen in FIG. 25, the system 100 can include a computer system 232 or computer server with at least one database 234. The computer system 232 can be used to receive, store, process, and transmit user 101 data and other data to user 101 display devices 102 and user 101 components. The computer system 232 can also join the network 110 in a similar fashion as other devices and components of the system 100. In some embodiments, the computer system 232 can host the transceivers, gateways, routers etc. that can facilitate establishing the network 110. In one embodiment, the computer system 232 can store the unique identifiers 222 and control level indicators 228 of each user 101. The computer system 232 can identify a plurality of users 101 (via the unique identifiers 222 and control level indicators 228) as part of a contingent (e.g., a team, a unit, a fighting force, etc.). The users 101 of a contingent can be identified as friendlies 238. The system 100 can be configured such that only users 101 identified as friendlies 238 can join the network 110.

Figure 26:
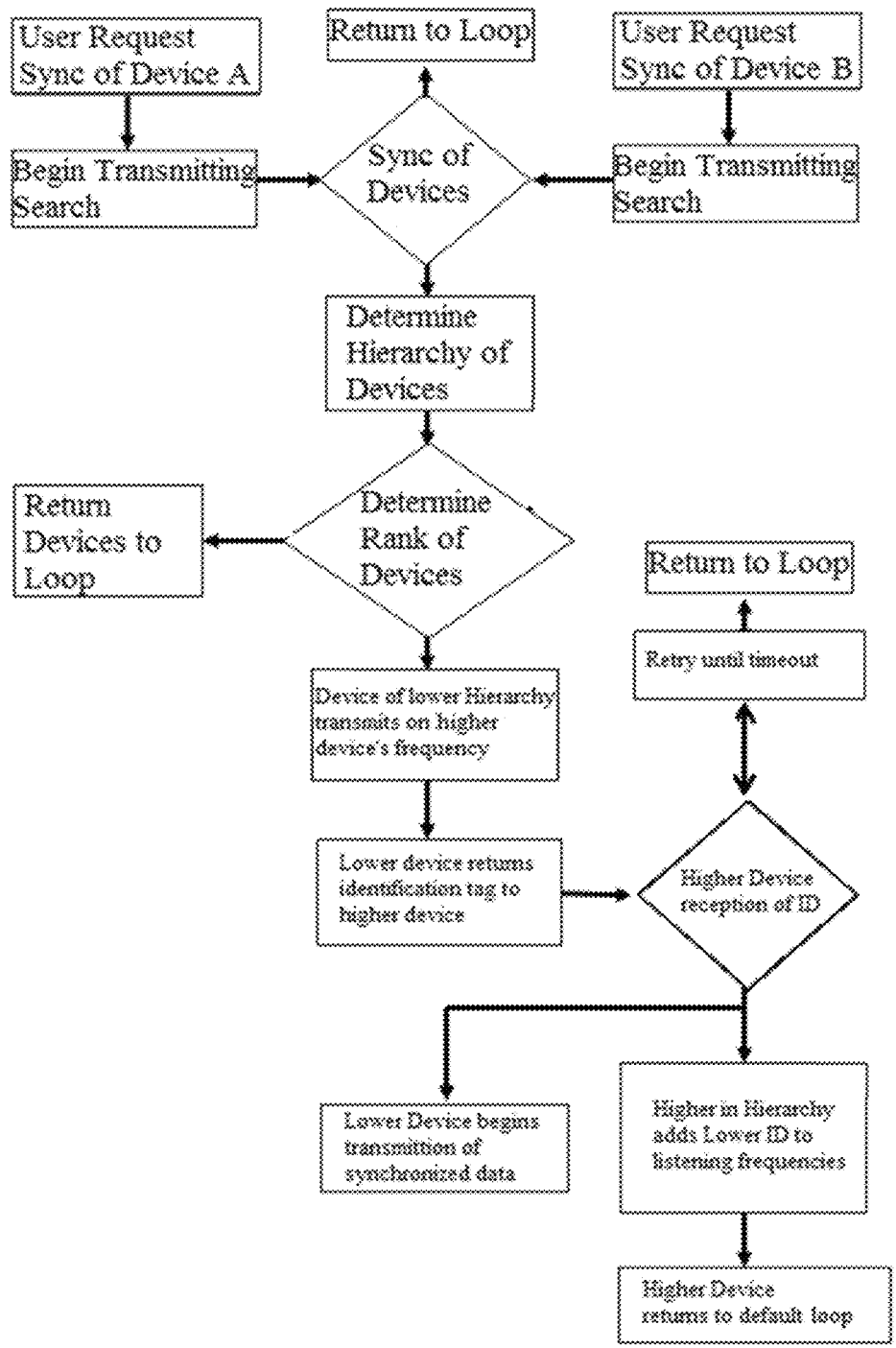
FIG. 26 shows an exemplary process flow of users connecting to the network and the system establishing a hierarchy of operational control.

FIG. 26 shows an exemplary synchronization process by which a hierarchy of operational control can be established for users 101 attempting to join the network 110. In this exemplary embodiment, when a user 101 (e.g., via their fob 212) attempts to join the network 110, the system 100 acquisitions information from the computer system 232 to determine if the user 101 is a friendly 238. If the user 101 cannot be identified as a friendly 238, his or her system 100 proceeds to a default loop of not communicating with the network 110. In addition, each of the user's 101 system 100 already in the network 110 proceeds to a default loop of continuing communications within the network 110. If the user 101 attempting to join the network 110 is determined to be a friendly 238, then the user 101 can begin communications with other users within the network 110. This can include user components communicating with other user components in accordance with the hierarchy of operational control. The communications can first begin with configuring or reconfiguring the hierarchy of operational control of the network 110 based on all of the users' 101 control level indicator values. Once the hierarchy of operational control is configured or reconfigured, normal communications between users can continue.

It is contemplated for users of the computer system 232 can also configure or reconfigure the hierarchy of operational control, set, re-set, or re-assign control level indicators 228, exercise command and control of user components, etc.

The synchronization process can permit the display devices 102 and other components of the various users 101 of the network 110 to transmit data among each component of the system 100 with minimum interference, can prevent lower ranking devices from viewing friendly logistics, and can be used to designate inventory to specific users 101. Furthermore, the requirement of a synchronization process prior to user 101 data transmission between users 101 can prevent hostile 240 or other non-friendly entities 240 from observing friendly data. Further still, if a non-friendly entity 240 does access a friendly device their data can be detectable from higher hierarchy levels, making it possible to quickly sever the connection.

The unique identifier 222 (including the control level indicator 228) can be physically imparted into or onto a component of the system 100. For example, a barcode, matrix code, etc. can be painted, printed, etched, or otherwise attached to a portion of a user's 101 component. Thus, a component can not only be virtually associated with a user 101, but it can also be physically associated with a user 101. Each unique identifier 222 and control level indicator 228 can be physically imparted on a component in case of critical failure of the component.

As noted above, control of a display device 102 or other component can be achieved by causing any user 101 display device 102 or user component to turn on/off, activate/deactivate, permit/prevent transmission of data, etc. It is contemplated for the control of a component to at least include the capability to disable or de-activate the transceiver of the component. The ability to disable or de-activate a transceiver serves a number of functions, including the ability to prevent enemy users from being able to detect friendly communications.

Figure 27:
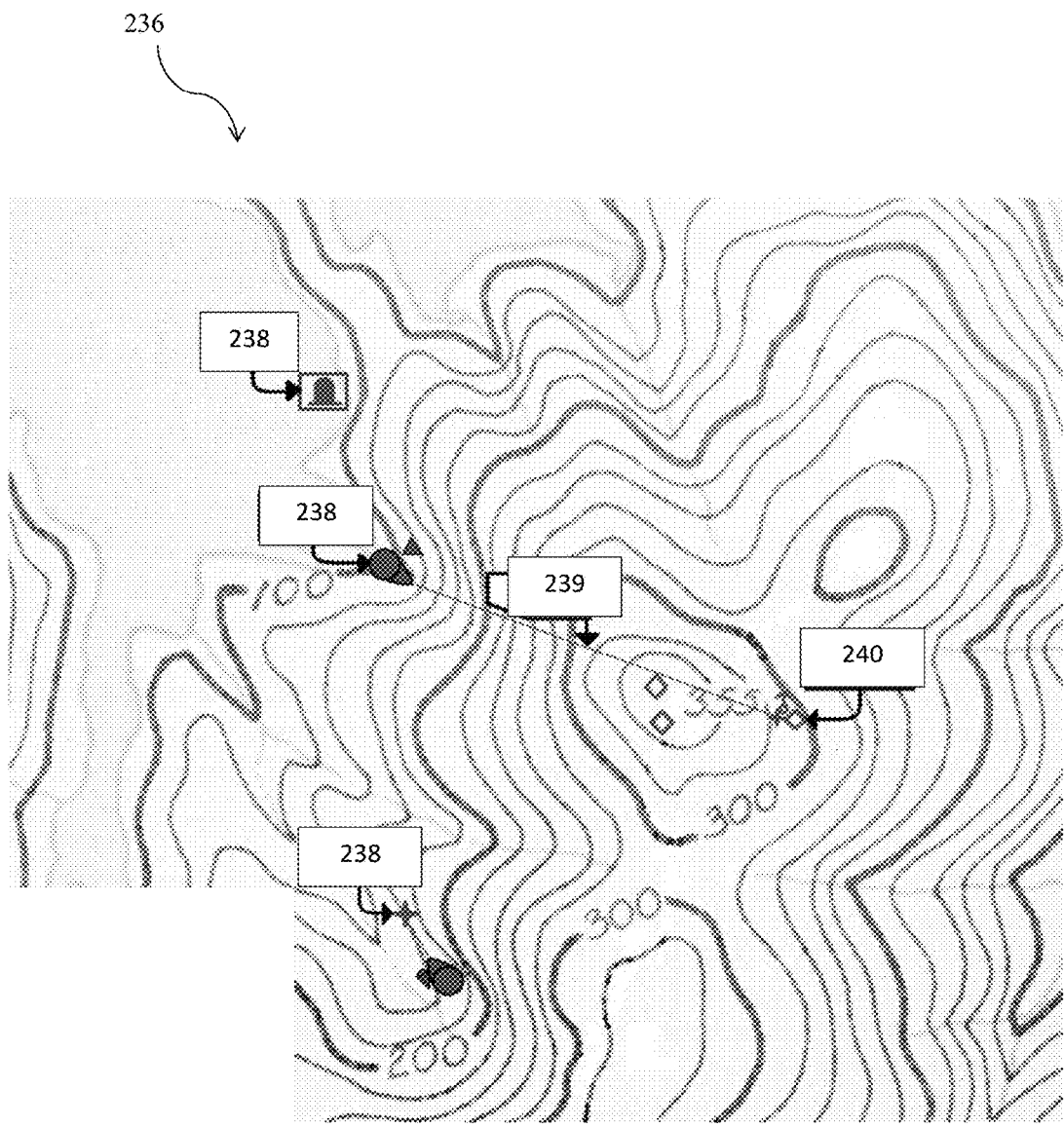
FIG. 27 shows an exemplary map operational mode that can be used to display a map via the display device.

Referring to FIG. 27, the data transmitted to the display device 102 can be used to generate a map 236 of the field of view of a user 101. For example, the various sensor data, GPS device 182 data, range finder 210 data, data from a third-party device 226, data from the computer system 232, etc. may be used generate a map of the field of view for display via the display device 102. The map 236 can further include real-time data. The map 236 can be a contour map of the terrain, a topological map, a 3-D computer generated image, etc. The identification of friendlies 238 by the system 100 can be used to plot all friendlies 238 on the map 236. For example, the system 100 can identify friendlies 238 via use of the GPS co-ordinate data 182. For instance, user's 101 GPS position on map 236 can be transmitted to the computer system 230 for processing and transmission to other user 101 display devices 102. GPS data from GPS devices 182 can be compiled and processed for generating relative positions of each friendly 238 on the map 236.

Some embodiments can include features to allow a user 101 or a device to "paint a target". Painting a target can include emitting a light beam on a target and using the reflections of the light beam to highlight the target. Highlighting the target can be used to provide a guidance signal for munitions to follow. Highlighting the target can allow the system 100 to identify the target and determine coordinates of the target so as to ascertain the position of the target. For example, any of the range finders 210 and/or third-party devices 226 can paint a target and transmit the painted target to any other component of the system 100. This can allow a user 101 to paint a target and allow other users 101 to view the painted target on their display devices 102. The painted target can be superimposed on the map 236 so that a user 101 can see the position of the painted target relative to the user 101 and other users 101.

For example, a third-party device 236 can be a drone that paints all non-friendlies 238 (e.g., paints targets that are not identified as friendlies 238 via the GPS devices 182 associated with the friendly 238 or IR Stobes). Other techniques, such as heat signatures and other information can be used to identify the non-friendlies 238 as humans, machinery, or other targets that may be fired upon by users 101 of the network 110. A user 101 of the computer system 232, or some other means, can then identify those targets as hostiles 240. The positions of these hostiles 240 can be transmitted to each user's 101 display device 102 and superimposed on the map 236. A user 101 can then view the map 236 to see the relative positions of friendlies 238 and hostiles 240. The range finder 210 and/or the third-part device 236 can also provide distance information 239 of the painted target relative to the user 101. This distant information can be displayed on a user's 101 display device 102.

While known systems, such as use of LIDAR and beam guidance permit direction for friendly forces, they require a user 101 to have line of sight with the target. The system 100, however, is capable of one time painting of a target using the various sensors and other components to continuously transmit information about targets without the user 101 having to maintain a line of sight with the target.

As noted above, the display device 102 can provide various types of information to a user 101 about the field of view. This information can be displayed via different display modes. The display device 102 can include toggle buttons that can control operational modules for a user 101 to switch between the different display modes. For example, the display device 102 can be used in a field of view mode (FIGS. 8-12), allowing user 101 to see down the line-of-sight 134 of the rifle 106 and view pertinent information while still seeing the field of view. The display device 102 can be used in a map overlay mode (FIG. 27), allowing user 101 to see the map 236 with relative positions between friendlies 238 and hostiles 240. Other operational modes can be used.

Figure 10:
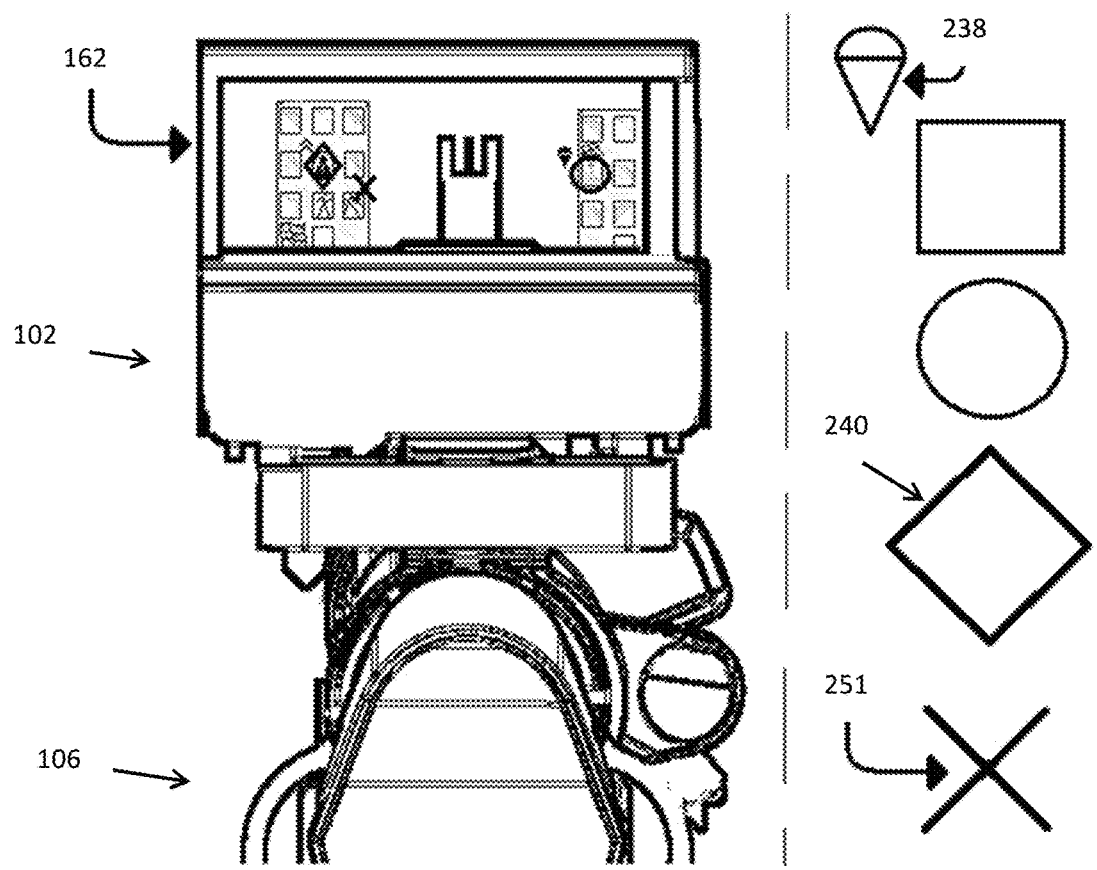
Figure 11:
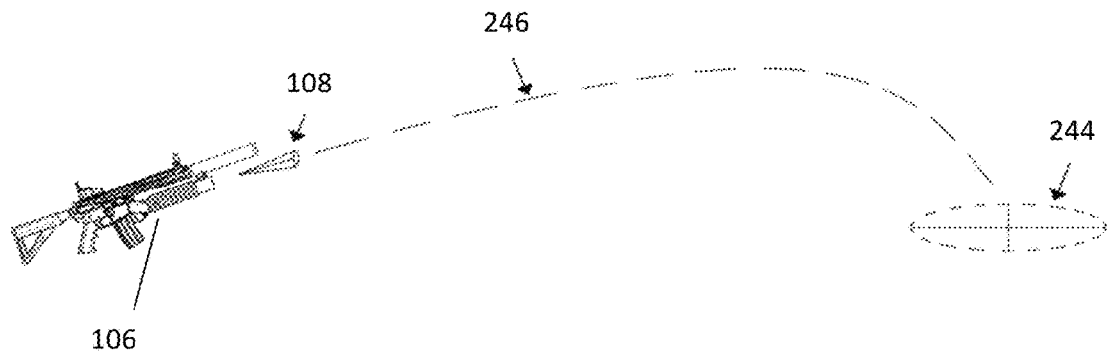
Figure 12:
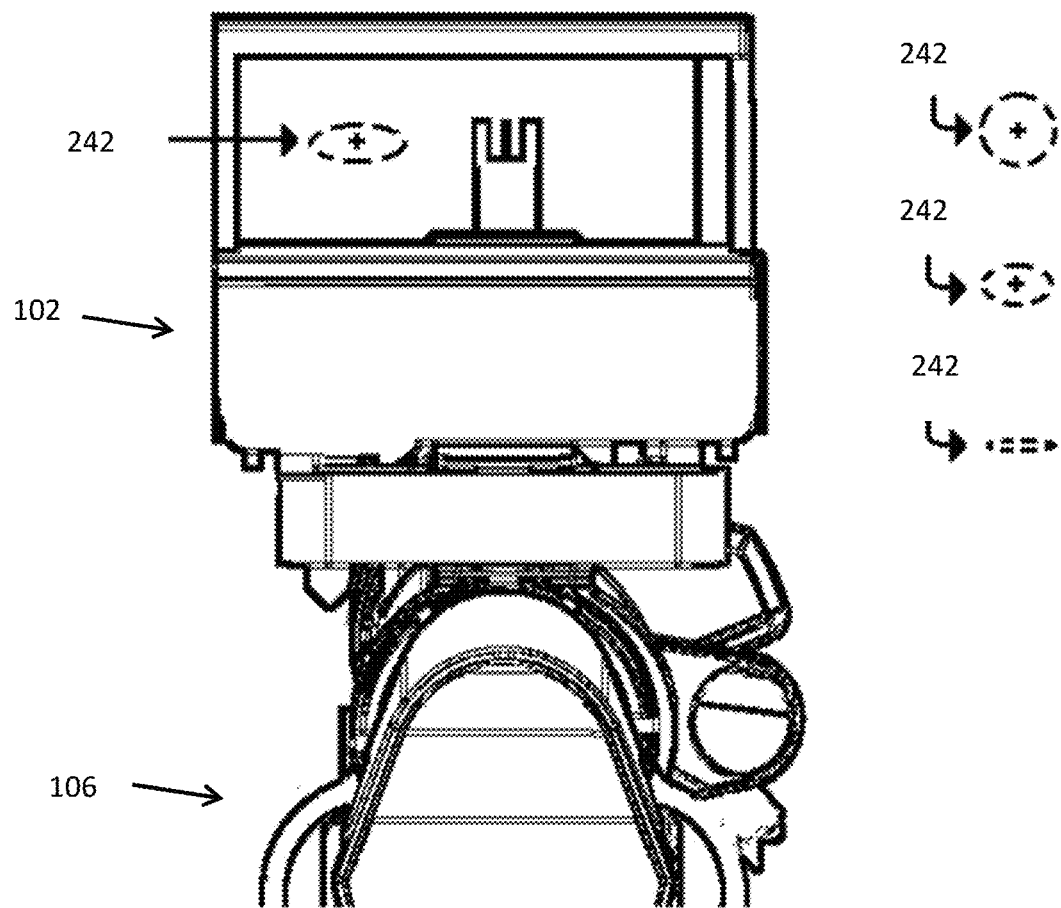

Referring to FIG. 10, in the field of view mode, the graphics display 162 can identify friendlies 238 and hostiles 240 by indicating them as a pixel on the display screen 190. For example, a pixel of a certain shape or color can indicate a friendly 238 and the display device 102 can project the friendly pixel on the display screen 190 at a location within the field of view where the friendlies 238 are located. A pixel of a certain shape or color can indicate a hostile 240 and the display device 102 can project the hostile pixel on the display screen 190 at a location within the field of view where the hostiles 240 are located. The range finder 210 of a user's 101 device can also inform other users 101 where the user's 101 rifle 106 is currently being aimed 251. The display device 102 can be configured to display NATO symbology for defining friendlies 238 and hostiles 240, as well as other pertinent information (e.g., branch of service, orientation, etc.).

Referring back to FIGS. 2-5 and 8-12, the system 100 can be used to calculate a user's 101 position, the rifle's 106 position, ballistic characteristics of the projectile 108, the computed point-of-impact of the projectile 108, a CEP of the projectile 108 (e.g., a circular error probable point of impact of a projectile), etc. For example, the display device 102 can display an area of certainty 242 of unpredictable projectiles 108 (e.g., such as a grenade launcher). These areas of certainty 242 can be referred to as circular error probable 242. The CEP(s) may be displayed using equations 14-23 (discussed below) with the addition of an error constant 244 projected along the predicted path 246.

The device 105 details to the user 101 the Point of Impact 1701, Reference point 1702, In rifle Magazine count 1703, Associated with Fob Count 1704, Range to Target 1705, Wind speed 1706, Wind Direction 1707 relative to direction of rifle, Off-sight Point of Impact 1708, and Cardinal Direction 1709 of rifle. The system 100 can also correct for environmental and user 101 changes such as windage, temperature, barometric pressure, caliber of round, coefficient of friction, humidity, tilt of the rifle, projectile weight, projectile velocity, difference of elevation, etc. These calculations can be performed using the equations below.

The system 100 can first perform a calibration to obtain reference points and reference measurements. For example, the system 100 can first determine the location of the user 101 via a calibration mode. In the calibration mode, the user 101 first enters in values into the display device 102. These values can include the distance 201 from the muzzle end 122 to the front sight 132; the distance 202 from front sight 132 to the rear sight 130; the height 401 of front sight 132 to the bottom front sight fix position 304; the height 306 of rear sight 130 to the center of the barrel 114 perpendicular to rear sight 130; and the height of bottom position 402 on the front sight 132 to the center of the muzzle end 122. A user 101 can then align a Top Sighting Pixel 308 displayed on the display device 102 to a top of the front sight 132. A user 101 can also align a Bottom Sighting Pixel 309 to a fixed position on the front sight 132.

After calibration, the display device 102 can compute the user's location in relation to the muzzle end 122 by using the following formulas.

Key for formulas:
RsHeight 306=The height of the rear sight to the center of the barrel perpendicular to the sight 306.
PHeight=The height of a pixel.
UserYActual 502=The user's height above the muzzle where the muzzle is the origin.
UserXActual=The user's distance off center above the muzzle adjusted for tilt.
PTop 301=The number of pixels above the bottom of the sight the user to the top calibration pixel 308.
PBot 203=The number of pixels above the bottom of the sight the user to the bottom calibration pixel 203.
FSDiffTop 401=Difference between front sight peak height 202 and top pixel height 301.
FSDiffBot 402=Difference between bottom pixel height 203 and front sight fixed position height 204.
FSAngleTop 403=Angle of the front sight peak 202 relative to the user's eye 205.
FSAngleBot 404=Angle of the front sight fixed position 204 relative to the user's eye 205.
UserAngle 405=Angle from the front sight peak round counter 213 relative to front sight fixed position 204, where the user 205 is the vertex.
BottomAngle 406=The complementary angle to FSAngleBot 206.
FSPeakToUser Dis 407=The front sight peak to user distance.
UserZFixed 408=The distance of the user down the gun from the muzzle.
UserYFixed 409=The user's height above the center of the barrel perpendicular to the center of the barrel.
UserXFixed=The user's distance off center above the muzzle.
CalibratedX 1602=The Calibration pixel's X distance 1602 off center of perpendicular of the muzzle 1601.
UserZActual 501=The user's distance down the barrel in the Z axis where the muzzle is the origin.

Equations for User Positioning

To compute the difference of height between the Top Sighting Pixel 308 and the Bottom Sighting Pixel 309 on the display device 102 from the differences of the front sight peak 308 and the front sight fixed top position 302, the following equations are used.

$$FSDiffTop\ 405 = \text{Front Sight Peak Height } 202 - (Ptop\ 403 * PixelHeight\ 402 + RsHeight\ 306) \quad \text{Eq. 1}$$

$$FSDiffBot\ 406 = \text{Front sight lower height } 1103 - (PBot\ 404 * PixelHeight\ 402 + RsHeight\ 306) \quad \text{Eq. 2}$$

To evaluate the degree of angles that the front sight peak and bottom fixed position make in relation to the user's 101 position, the values computed from the first two equations, Eq. 1 and Eq. 2, are used in the following two equations, Eq. 3 and Eq. 4.

$$FSAngleTop\ 407 = \text{Arctan}(RearSightZ\ 1102 / FSDiffTop\ 405) \quad \text{Eq. 3}$$

$$FSAngleBot\ 408 = \text{Arctan}(RearSightZ1106 / FSDiffBot\ 406) \quad \text{Eq. 4}$$

To evaluate the angle that the user's 101 position is in relation to these two former values, the two values from Eq. 3 and Eq. 4 are used to compute the aforementioned user's 101 angle as shown in Eq. 5.

$$\text{User Angle } 409 = \Pi - (FsAngleTop\ 407 + FsAngleBot\ 408) \quad \text{Eq. 5}$$

To evaluate the angle that the bottom fixed position is in relation to the user's eye, the value from Eq. 4 are used to compute the aforementioned bottom fixed angle as shown in Eq. 6.

$$BottomAngle\ 410 = \Pi * 0.5\ FsAngleBot\ 408 \quad \text{Eq. 6}$$

To evaluate the distance from the user's 101 position to the front sight peak round counter 213, the values from Eq. 4 and Eq. 5, the height of the front sight 132 to the bottom front sight fix position 302, and the Law of Sines are used to determine distance from the user's 101 position to the front sight peak 415.

$$FSPeakToUser\ Dis\ 411 = (\text{Height of front sight } 401 * \sin(FsAngleBot\ 408)) * \sin(\text{User Angle } 409) \quad \text{Eq. 7}$$

To evaluate the distance the user 101 is down the muzzle from the barrel (User 101ZFixed 412), the sums from Eq. 3, FSAngleTop 407, FSPeakToUser 101Dis 411, and the distance from the muzzle to the front sight are used.

$$\text{User } 101ZFixed\ 412 = \sin(FSAngleTop\ 407) * FSPeakToUser\ 101Dis\ 411 + \text{Front Sight } Z \text{ distance } 201 \quad \text{Eq. 8}$$

To evaluate the perpendicular height the user 101 is at the distance they are down the Muzzle, (User YFixed 413), BottomAngle 410, User ZFixed 412 from Eq. 8, the distance from the muzzle to the front sight 132, and the front sight bottom fixed height above muzzle 122 are used.

$$\text{User } 101YFixed\ 413 = \sin(BottomAngle\ 410) * (\text{User } 101ZFixed\ 412 - \text{Muzzle to front Sight Distance } 201) + \text{Front sight height above muzzle } 105 \quad \text{Eq. 9}$$

To evaluate the distance, the user 101 is across the muzzle (User XFixed 414), the sums of Eq. 8, the distance from the rear sight to the front sight 132, the across distance the pixel is off center of perpendicular to the center of the muzzle 415, the user's Z fixed distance 412 and the distance from the muzzle to the front sight 132 are used.

$$\text{User } X\text{Actual} = ((\text{Calibrated}X\ 1602 - \text{the number of width pixels}*0.5)*P\text{Height})/(\text{The rear sight } Z \text{ distance} + \text{the front sight } Z \text{ distance})*(\text{User } 101 Z\text{Fixed} - \text{the front sight } Z \text{ distance } 201) \qquad \text{Eq. 10}$$

The user's fixed positions determine the relationship between the rifle and the user. This information is converted to determine the relationship between the user and the muzzle, because of the ballistics equations that use the muzzle as the origin. Therefore, to determine where the user is in relation to the point of impact, the point of impact and the user are set on the same plane. To do so, the next three equations make use of the sums of Eq. 8 through 10 to correct for the tilt measured by the gyroscope.

The next three equations make use of the gyroscopic inclination tilt, $\partial$, the gyroscopic x tilt, $\Delta$, and the sums of the Eq. 8 through 10.

$$\text{User } Z\text{Actual} = \cos(\partial)*\text{User } Z\text{Fixed } 412 + \text{abs}(\sin(\partial))*\text{User } Y\text{Fixed } 413*\cos(\Delta) + \text{User } X\text{Fixed } 414*(-\sin(\Delta))*\sin(\partial)) \qquad \text{Eq. 11}$$

$$\text{User } Y\text{Actual} = \cos(\partial)*\text{User } Y\text{Fixed}*\cos(\Delta) + \sin(\partial)*\text{User } Z\text{Fixed} + \text{User } X\text{Fixed}*(-\sin(\Delta))*\cos(\partial) \qquad \text{Eq. 12}$$

$$\text{User } X\text{Actual} = \text{User } X\text{Fixed}*\cos(\Delta) + \sin(\Delta)*\text{User } Y\text{Fixed}; \qquad \text{Eq. 13}$$

In order to determine the ballistic trajectories, various sensor input, including atmospheric density (AD), projectile velocity, velocity, ballistic coefficient of friction (CoF), cross sectional area of projectile (CA), drag, projectile weight, weight, and target distance are used. CoF and CA are given data from the manufacture of the projectile. Air density, AD, is calculated using ideal gas law: AD=Absolute Pressure/(Temperature*Specific Gas Constant).

The following functions are interdependent and will loop until distance traveled is equal to or greater than target distance. The trapezoidal method is one form of numerical calculation that has proven effective for this application.

Key for Formulas:
Drag Z=the drag in the z axis, slowing the projectile in relation between the user 101 and the target.
DragY=the drag in the y axis slowing the projectile in relation to being perpendicular to the ground plane.

The proceeding functions are iterated until distance traveled is equal to or greater than target range:

$$\text{Drag}Z = (AD*CoF*CA*0.5)/\text{Weight}*(\text{Velocity}*\text{Velocity}Z) \qquad \text{Eq.14}$$

$$\text{Drag}Y = \text{Acceleration due to gravity} - (AD*CoF*CA*0.5)/\text{Weight}*(\text{Velocity}*\text{Velocity}Y) \qquad \text{Eq.15}$$

$$\text{Distance Traveled} = \text{Incremental value}*\text{Velocity}Z \qquad \text{Eq.16}$$

$$\text{HeightChange} = \text{Velocity}Y*\text{incremental value} \qquad \text{Eq.17}$$

$$\text{Velocity}Z = \text{Incremental value}*\text{Drag}Z \qquad \text{Eq.18}$$

$$\text{Velocity}Y = \text{Incremental value}*\text{Drag}Y \qquad \text{Eq.19}$$

The difference of height, or YDrop, between the user and point of impact can be calculated in Eq. 20.

$$Y\text{Drop} = (\text{HeightChange} - \text{user } Y)/(\text{Distance Traveled} + \cos(\partial)*(\text{Rear Sight } Z \text{ distance} + \text{Front Sight } Z \text{ distance}))*(\text{User } Z\text{Actual} - (\text{Rear Sight } Z \text{ distance} + \text{Front Sight } Z \text{ distance})*\cos(\partial)) \qquad \text{Eq. 20}$$

To calculate the difference in height of the rear sight in the Z distance, YDrop is used as a line and the slope is extracted from this line. By multiplying the Z distance between the user and the rear sight, a difference of height or YDifference can be generated.

$$Y\text{Difference} = ((\text{Rear sight } Y \text{ height } 306 + P\text{Height}*(\text{number of pixels vertically on display}/2))*\cos(\partial) + ((\text{Rear Sight } Z \text{ distance} + \text{Front Sight } Z \text{ distance})*\sin(\partial))) - (\text{User } Y\text{Fixed} + y\text{Drop}) \qquad \text{Eq. 21}$$

To calculate the X difference at the rear sight, the User's X distance is divided by the total distance between the user 101 and the target, and multiplied by the distance the user to the rear sight.

$$X\text{Difference} = \text{User } X\text{Actual}/(\text{User } Z\text{Actual} + \text{Distance Traveled})*(\text{User } Z\text{Actual} - ((\text{Rear Sight } Z \text{ distance} + \text{Front Sight } Z \text{ distance})*\text{abs}(\cos(\partial)))) \qquad \text{Eq. 22}$$

To evaluate what pixel in the vertical direct needs to be displayed to be equal with the three dimensional point that is on the line between the user and POI, the sum from Eqs. 21 and 22, Z Angle, and pixel height can be used.

$$\text{Pixel}Y = -((Y\text{Difference}*\cos(\Delta) + X\text{Difference}*\sin(\Delta))/P\text{Height} + 0.5) \qquad \text{Eq. 23}$$

From the summed values from Eqs. 11, 12, 13, 16, and 17, a three-dimensional representation of the user, the rear sight, and point of impact (POI) can be generated. Using this three-dimensional representation, a line from the user to the POI can be created that intersects at some point on the rear sight.

Using the user as the beginning of a line and the muzzle as the origin, the following equations represent a three-dimensional point corresponding to the rear sight and the line between the user and POI.

To calculate what pixel in the horizontal direct needs to be displayed to be equal with the three-dimensional point that is on the line between the user and POI, the sum from Eqs. 21 and 22, Z Angle, and pixel height can be used.

$$\text{Pixel}X = ((X\text{Difference}*\cos(\Delta) + Y\text{Difference}*\sin(\Delta))/P\text{Height} + 0.5) \qquad \text{Eq. 24}$$

Each system can use the local gyroscope and range finder to gauge height difference of some desired point from their current location or from another desired point. This can be achieved by using the following formula for point to user height difference.

$$\text{Height} = \sin(\partial)*\text{Range} \qquad \text{Eq. 25}$$

The following three formulas can be used to calculate the height difference between two points, $$\text{Height}_1 = \sin(\partial_1)*\text{Range} \qquad \text{Eq. 26}$$

$$\text{Height}_2 = \sin(\partial_2)*\text{Range}_2 \text{ surrounding areas.} \qquad \text{Eq. 27}$$

$$\text{Height difference} = \text{Abs}(\text{Height}_1 - \text{Height}_2) \qquad \text{Eq. 28}$$

The point-of-impact 1701 corresponds to outputs PixelX and PixelY calculated in Eqs. 23 and 24. Reference point 1702 corresponds to the PTop 308 and CalibratedX 1602. Magazine count 1703 corresponds to outputs from the round counter 213. Associated with Fob count 1704 corresponds to outputs from the fob 212. Range to Target 1705, corresponds to outputs from the range finder 210. Range to Target 1705 can display in units selected by user 101. Wind Speed and Wind Direction 1706 and 1707 correspond to inputs from the user 101 or from transceiver data from the round counter 213. Off-sight Point of Impact 1708 corresponds to a Point of Impact 1701 that exceeds the bounds of the display device 102. Cardinal Direction 1709 corresponds to outputs from the GPS device 182.

The curvature of the earth can be factored in determining the ballistic characteristics of the projectile 108. These can be based on GPS location of the user 101 and the heading of the projectile 108. For example, a geodetic position of the two positions can be determined with an azimuth and distance using the equations below. The coordinates of the two positions can be used to determine the Geoid heights at their respective latitude and longitude. The difference in the Geoid heights between the two is the rise/fall of the earth in relation to the projectile's 108 normal plane to the earth's core.

Equations for generating a WGS-84 GPS co-ordinate based on a heading, distance, and known co-ordinate are provided below:

Destination Given Distance and Bearing from Start Point (Direct Solution)

| | |
|---|---|
| $\tan U_1 = (1 - f) \cdot \tan \varphi_1$ | (U is 'reduced latitude') |
| $\cos U_1 = 1 / \sqrt{1 + \tan^2 U_1}$, $\sin U_1 = \tan U_1 \cdot \cos U_1$ | (trig identities; §6) |
| $\sigma_1 = \operatorname{atan}(\tan U_1/\cos \alpha_1)$ | (1) |
| $\sin \alpha = \cos U_1 \cdot \sin \alpha_1$ | (2) |
| $\cos^2 \alpha = 1 - \sin^2 \alpha$ | (trig identity; §6) |
| $u^2 = \cos^2 \alpha \cdot (a^2 - b^2)/b^2$ | |
| $A = 1 + u^2/16384 \cdot \{4096 + u^2 \cdot [-768 + u^2 \cdot (320 - 175 \cdot u^2)]\}$ | (3) |
| $B = u^2/1024 \cdot \{256 + u^2 \cdot [-128 + u^2 \cdot (74 - 47 \cdot u^2)]\}$ | (4) |
| $\sigma = s/(b \cdot A)$ | (first approximation) |
| iterate until change in $\sigma$ is negligible (e.g. $10^{-12} \approx 0.006$ mm) { | |
| $\cos 2\sigma_m = \cos(2\sigma_1 + \sigma)$ | (5) |
| $\Delta\sigma = B \cdot \sin \sigma \cdot \{\cos 2\sigma_m + B/4 \cdot [\cos \sigma \cdot (-1 + 2 \cdot \cos^2 2\sigma_m)$ $- B/6 \cdot \cos 2\sigma_m \cdot (-3 + 4 \cdot \sin^2 \sigma) \cdot (-3 + 4 \cdot \cos^2 2\sigma_m)]\}$ | (6) |
| $\sigma' = s / b \cdot A + \Delta\sigma$ | (7) |
| } | |
| $\varphi_2 = \operatorname{atan}(\sin U_1 \cdot \cos \sigma + \cos U_1 \cdot \sin \sigma \cdot \cos \alpha_1 /$ $(1 - f) \cdot \sqrt{\sin^2 \alpha + (\sin U_1 \cdot \sin \sigma - \cos U_1 \cdot \cos \sigma \cdot \cos \alpha_1)^2}\ )$ | (8) |
| $\lambda = \operatorname{atan}(\sin \sigma \cdot \sin \alpha_1/\cos U_1 \cdot \cos \sigma - \sin U_1 \cdot \sin \sigma \cdot \cos \alpha_1)$ | (9) |
| $C = f/16 \cdot \cos^2 \alpha \cdot [4 + f \cdot (4 - 3 \cdot \cos^2 \alpha)]$ | (10) |
| $L = \lambda - (1 - C) \cdot f \cdot \sin \alpha \cdot \{\sigma + C \cdot \sin \sigma \cdot [\cos 2\sigma_m + C \cdot \cos \sigma \cdot (-1 + 2 \cdot \cos^2 2\sigma_m)]\}$ | (11) |
| $\lambda_2 = \lambda_1 + L$ | |
| $\alpha_2 = \operatorname{atan}(\ \sin \alpha/-(\sin U_1 \cdot \sin \sigma - \cos U_1 \cdot \cos \sigma \cdot \cos \alpha_1)\ )$ | (12) | a, b = major & minor semi-axes of the ellipsoid
f = flattening (a − b)/a
$\varphi_1, \varphi_2$ = geodetic latitude
L = difference in longitude
s = length of the geodesic along the surface of the ellipsoid (in the same units as a & b)
$\alpha_1, \alpha_2$ = azimuths of the geodesic (initial/final bearing)
Where:
$\varphi_2, \lambda_2$ is destination point
$\alpha_2$ is final bearing (in direction $p_1 \rightarrow p_2$)

It should be understood that modifications to the embodiments disclosed herein can be made to meet a particular set of design criteria. For instance, any of the components can be any suitable number or type of each to meet a particular objective. Therefore, while certain exemplary embodiments of the system 100 disclosed herein have been discussed and illustrated, it is to be distinctly understood that the invention is not limited thereto but may be otherwise variously embodied and practiced within the scope of the following claims.

It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

What is claimed is:

1. A display system, comprising:
   a display device, comprising:
   a case configured to be attached to a weapon, the weapon capable of firing a projectile; and
   a graphics display supported by and/or housed within the case, the graphics display, comprising:
   a plurality of sensors, at least one of which being a GPS sensor, configured to obtain sensor data regarding a field of view for a user of the display device, identification of a user of another display device as a friendly, and identification of a target as a hostile;
   a display processor configured to receive the sensor data and process the sensor data to generate information, the information comprising a point-of-impact of the projectile, a position of the display device, a position of the display device relative to another display device identified as a friendly, a position of a target identified as a hostile relative to the display device, and a position of a target identified as a hostile relative to another target identified as a hostile; and
a display screen configured to display a head-up-display comprising a map of the field of view and the information superimposed on the map.

2. The display system recited in claim 1, wherein at least one sensor is external to the display device but is in wireless communication with the display processor.

3. The display system recited in claim 1, comprising a plurality of display devices.

4. The display system recited in claim 3, wherein the graphics display of each display device comprises a display transceiver.

5. The display system recited in claim 4, wherein:
the plurality of display devices comprises a first display device and a second display device;
the first display device comprises: a first graphics display configured to generate first information; and a first display transceiver configured to transmit the first information;
the second display device comprises: a second graphics display configured to generate second information; and a second display transceiver configured to transmit the second information;
the first display transceiver is configured to receive the second information and the second display transceiver is configured to receive the first information;
the first display device is configured to display the first information and at least a portion of the second information via the first graphics display; and
the second display device is configured to display the second information and at least a portion of the first information via the second graphics display.

6. The display system recited in claim 1, further comprising:
a range finder including a range finder transceiver, the range finder configured to generate ranging data;
wherein the graphics display comprises a display transceiver; and
wherein the display transceiver is configured to receive the ranging data and transmit the ranging data to the display processor, the display processor using the ranging data to generate the information.

7. The display system recited in claim 1, further comprising:
a round recorder including a round recorder transceiver, the round recorder configured to generate a round count signal;
wherein the graphics display comprises a display transceiver; and
wherein the display transceiver is configured to receive the round count signal and transmit the round count signal to the display processor, the display processor using the round count signal to generate the information.

8. The display system recited in claim 1, further comprising:
a magazine insert sensor including a magazine insert sensor transceiver, the magazine insert sensor configured to generate a magazine insert signal;
wherein the graphics display comprises a display transceiver; and
wherein the display transceiver is configured to receive the magazine insert signal and transmit the magazine insert signal to the display processor, the display processor using the magazine insert signal to generate the information.

9. The display system recited in claim 1, further comprising:
an electronic controller including an electronic controller transceiver, the electronic controller configured to generate electronic controller data;
wherein the graphics display comprises a display transceiver; and
wherein the display transceiver is configured to receive the electronic controller data and transmit the electronic controller data to the display processor, the display processor using the electronic controller data to generate the information.

10. The display system recited in claim 9, wherein:
the electronic controller has an RFID scanner capable of scanning for RFID tags;
at least one RFID tag is associated with an asset; and
wherein upon the RFID scanner detecting the at least one RFID the associated with the asset, an inventory log is generated for the asset as part of the electronic controller data.

11. The display system recited in claim 1, further comprising:
a third-party device including a third-party transceiver, the third-party device configured to generate a third-party data;
wherein the graphics display comprises a display transceiver; and
wherein the display transceiver is configured to receive the third-party data and transmit the third-party data to the display processor, the display processor using the third-party data to generate the information.

12. The display system recited in claim 1, wherein the graphics display comprises at least one viewing pane arranged adjacent the display screen.

13. The display system recited in claim 12, wherein the at least one viewing pane comprises a first viewing pane adjacent the display screen and a second viewing pane adjacent the display screen.

14. The display system recited in claim 1, wherein:
the weapon comprises a front sight and a rear sight defining a line-of-sight;
the case comprises a case first end and a case second end defining a longitudinal axis; and
the longitudinal axis is co-axial with the line-of-sight when the case is attached to the weapon.

15. The display system recited in claim 1, wherein the graphics display further comprises a light emitting diode assembly configured to generate at least one pixel on the display screen.

16. The display system recited in claim 1, further comprising a mount configured to attach to a portion of the weapon and configured to temporarily attach the case thereto.

17. The display system recited in claim 16, wherein the mount consists of a mount selected from the group of a pitcatinny mount and weaver mount.

18. The display system recited in claim 1, where the case is a housing for a rifle scope.

19. A display system, comprising:
a plurality of display devices, each comprising:
a case configured to be attached to a weapon, the weapon capable of firing a projectile;
a graphics display supported by and/or housed within the case, the graphics display, comprising:

a plurality of sensors, at least one of which being a GPS sensor, configured to obtain sensor data regarding a field of view for a user of the display device, identification of a user of another display device as a friendly, and identification of a target as a hostile;

a display processor configured to receive the sensor data and process the sensor data to generate information, the information comprising a point-of-impact of the projectile, a position of the display device, a position of the display device relative to another display device identified as a friendly, a position of a target identified as a hostile relative to the display device, and a position of a target identified as a hostile relative to another target identified as a hostile; and a display screen configured to display a head-up-display comprising a map of the field of view and the information superimposed on the map;

a display transceiver configured to receive and transmit the information;

a range finder including a range finder transceiver, the range finder configured to generate and transmit ranging data, the display transceiver configured to receive the ranging data;

a round recorder including a round recorder transceiver, the round recorder configured to generate and transmit a round count signal, the display transceiver configured to receive the round count signal;

a magazine insert sensor including a magazine insert sensor transceiver, the magazine insert sensor configured to generate and transmit a magazine insert signal, the display transceiver configured to receive the magazine insert signal;

an electronic controller including an electronic controller transceiver, the electronic controller configured to generate and transmit electronic controller data, the display transceiver configured to receive the electronic controller data;

wherein the electronic controller further comprises wireless communication circuitry configured to establish a network of the plurality of display devices.

\* \* \* \* \*